(12) United States Patent
Eisenhour

(10) Patent No.: US 9,452,661 B2
(45) Date of Patent: Sep. 27, 2016

(54) VEHICLE AIR CONDITIONING SYSTEM

(71) Applicant: Nissan North America, Inc., Franklin, TN (US)

(72) Inventor: Ronald Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 496 days.

(21) Appl. No.: 13/874,072

(22) Filed: Apr. 30, 2013

(65) Prior Publication Data

US 2014/0318159 A1    Oct. 30, 2014

(51) Int. Cl.
*F25B 49/00* (2006.01)
*B60H 1/32* (2006.01)

(52) U.S. Cl.
CPC ........... *B60H 1/3211* (2013.01); *B60H 1/3207* (2013.01); *B60H 2001/3261* (2013.01); *B60H 2001/3272* (2013.01)

(58) Field of Classification Search
CPC ............ B60H 1/00642; B60H 1/3207; B60H 1/3211; B60H 2001/3261; B60H 2001/3272
USPC ........................... 62/228.1, 176.1, 176.6, 227
See application file for complete search history.

(56) References Cited

U.S. PATENT DOCUMENTS

| | | | |
|---|---|---|---|
| 3,883,325 A * | 5/1975 | Fuhring et al. | 95/115 |
| 6,112,807 A * | 9/2000 | Dage | 165/202 |
| 7,165,411 B2 * | 1/2007 | Eisenhour | 62/228.3 |
| 7,975,496 B2 | 7/2011 | Eisenhour et al. | |
| 2008/0135635 A1 * | 6/2008 | Deng et al. | 236/44 C |
| 2010/0031680 A1 * | 2/2010 | Eisenhour et al. | 62/176.1 |
| 2010/0307177 A1 * | 12/2010 | Lifson et al. | 62/115 |
| 2010/0330895 A1 * | 12/2010 | Suetake et al. | 454/75 |
| 2011/0132014 A1 * | 6/2011 | Eisenhour | 62/228.1 |
| 2011/0271698 A1 * | 11/2011 | Errington et al. | 62/227 |
| 2012/0067965 A1 * | 3/2012 | Rajasekaran et al. | 236/44 C |
| 2013/0052929 A1 * | 2/2013 | Eisenhour | 454/75 |

* cited by examiner

*Primary Examiner* — Henry Crenshaw
(74) *Attorney, Agent, or Firm* — Global IP Counselors, LLP

(57) ABSTRACT

A vehicle air conditioning system includes a compressor configured to compress refrigerant, a condenser, an evaporator, a temperature sensor and a controller. The condenser receives the refrigerant from the compressor and the evaporator receives the refrigerant from the condenser. The temperature sensor is positioned proximate the evaporator to measure a temperature of air passing through the evaporator prior to entering a vehicle passenger compartment. The controller is operatively coupled to the compressor to cycle the compressor on and off based upon the temperature measured by the temperature sensor and correlation data stored in the controller that correlates temperatures at the evaporator to estimated moisture densities at the evaporator to maintain the moisture density of the air in the vehicle passenger compartment below a predetermined moisture density threshold.

18 Claims, 15 Drawing Sheets

VEHICLE AIR CONDITIONING SYSTEM

BACKGROUND

1. Field of the Invention

The present invention relates to a vehicle air conditioning system that controls compressor cycling in order to reduce engine workload. More specifically, the present invention relates to a vehicle air conditioning system that controls compressor cycling in response to estimated humidity conditions at the air conditioning system evaporator.

2. Background Information

Vehicle air conditioning systems typically maintain the temperature of the passenger compartment by operating a compressor to keep the evaporator at a temperature just above the freezing point of water. Air passing through the evaporator is cooled but is typically too cold to send directly into the passenger compartment. In recent model vehicles, a portion of the cooled air is re-heated by passing the portion of the cooled air through the heater core. The cold air and the re-heated air are mixed together prior to entering the passenger compartment in order to deliver cooled air that is not frigid.

This conventional way of operating the vehicle air conditioning system is inherently inefficient. Energy is wasted by cooling the evaporator to a temperature just above the freezing point of water regardless of the cooling requirements. Further, the re-heating of cooled air represents an additional waste of energy. Further, since the evaporator is cooled to a temperature that is close to, but above the freezing point of water regardless of cooling requirements of the air conditioning system, the cooled air is substantially dehumidified. Specifically, the majority of the moisture in the air passing through the evaporator condenses on the outer cooling surfaces of the evaporator. This moisture then typically drains out of the evaporator casing and falls beneath the vehicle. This results in an over-drying of the air entering the passenger compartment. For the comfort of the passengers, it is not necessary to remove all of the moisture from the cooled air.

From a driver visibility perspective, it is only necessary to remove sufficient amounts of moisture from the cooled air to prevent fogging on the interior surfaces of the windows of the vehicle. From a comfort perspective, it is only necessary to remove sufficient amounts of moisture to make passengers feel cool and comfortable

SUMMARY

One object of the disclosed technology is to reduce the thermal loading of an air conditioning system.

Another object of the disclosed technology is to reduce the work of a vehicle engine necessary to operate an air conditioning system compressor.

Another object of the disclosed technology is to minimize compressor operation while preventing fogging or condensation on inner surfaces of the vehicle windows.

Another object of the disclosed technology is to minimize the amount of moisture removed from cooled air passing over the heat exchanging surfaces of an air conditioning system evaporator.

In view of the state of the known technology, one aspect of the disclosed technology is to provide a vehicle air conditioning system with a compressor, a condenser, an evaporator, a temperature sensor and a controller. The compressor is configured to compress refrigerant and the condenser is fluidly coupled to the compressor to receive the refrigerant from the compressor. The evaporator is fluidly coupled to the condenser to receive the refrigerant from the condenser and fluidly coupled to the compressor to supply the refrigerant to the compressor. A temperature sensor is positioned proximate the evaporator to measure a temperature of air passing through the evaporator prior to entering a vehicle passenger compartment. The controller is operatively coupled to the compressor to cycle the compressor on and off based upon the temperature measured by the temperature sensor. Correlation data stored in the controller correlates temperatures at the evaporator to estimated moisture densities at the evaporator. Operation of the compressor uses the correlation data to maintain the moisture density of the air in the vehicle passenger compartment below a predetermined moisture density threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
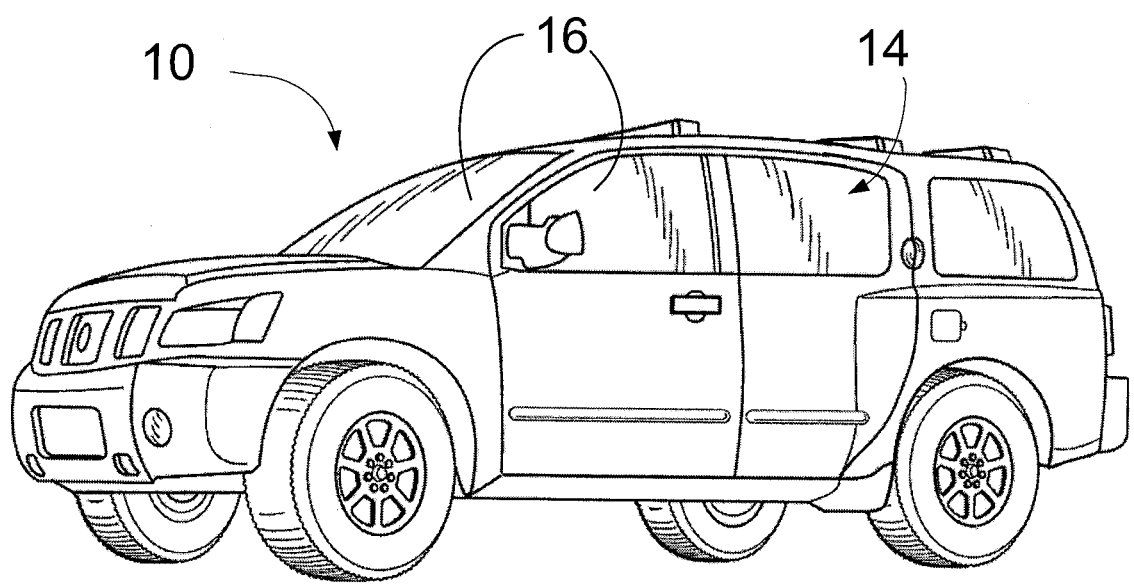
FIG. 1 is a perspective view of a vehicle having a passenger compartment with windows and an air conditioning system in accordance with a first embodiment.
Figure 2:
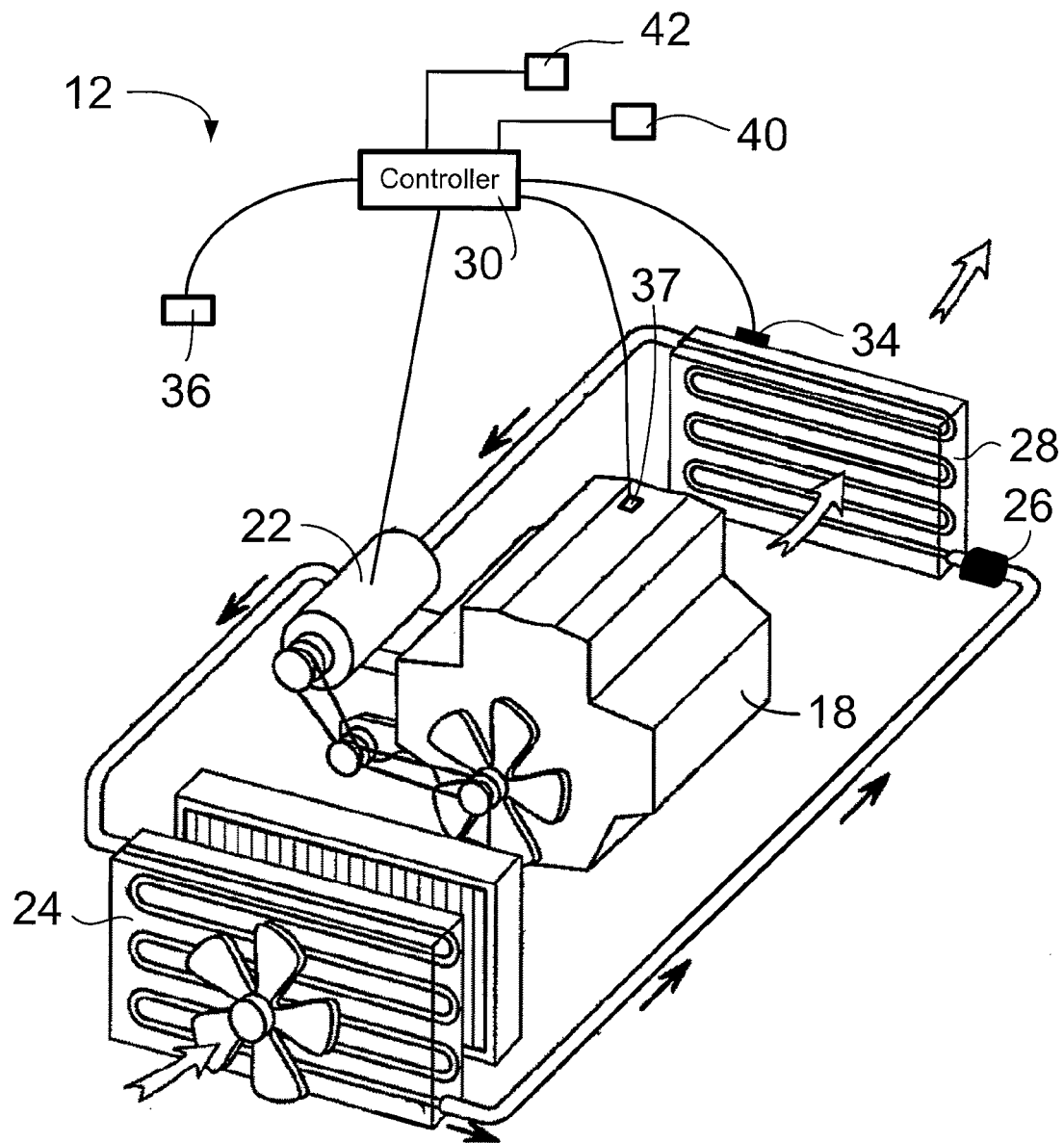
FIG. 2 is a schematic view of the air conditioning system shown with the vehicle engine, the air conditioning system having a compressor powered by the engine, a condenser, a controller and an evaporator in accordance with the first embodiment.
Figure 3:
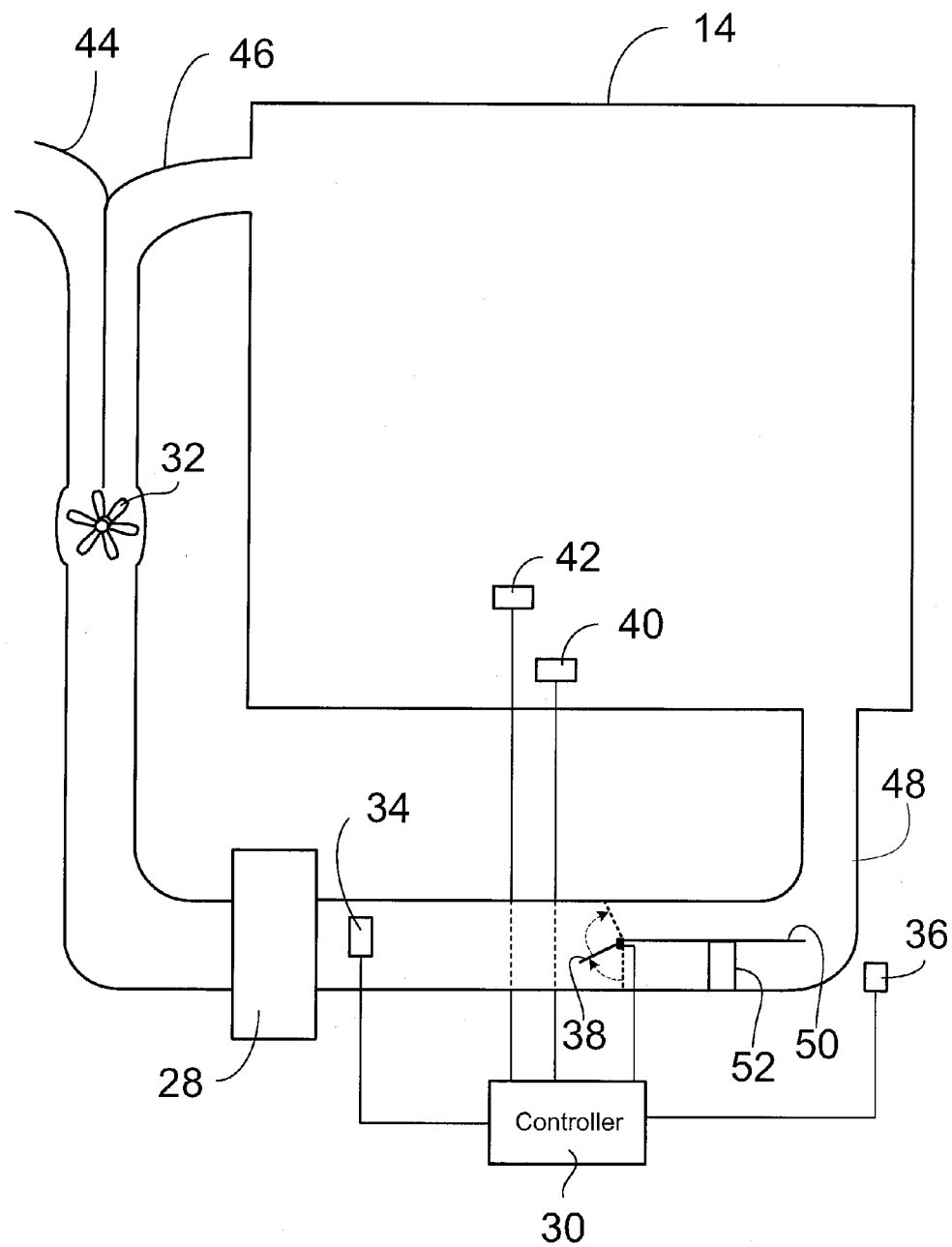
FIG. 3 is a schematic view of the air conditioning system showing a passenger compartment, the controller, the evaporator, a blower, a heater core mixing portion and various sensors connected to the controller in accordance with the first embodiment.

Referring initially to FIGS. 1, 2 and 3, a vehicle 10 is illustrated in accordance with a first embodiment. The vehicle 10 includes an air conditioning system 12 (FIGS. 2 and 3), a passenger compartment 14 (FIGS. 1 and 3) with windows 16 (FIG. 1) and an engine 18 (FIG. 2).

As shown in FIG. 2, the air conditioning system 12 includes a compressor 22, a condenser 24, an expansion device 26, an evaporator 28 and a controller 30. The compressor 22 is configured to compress refrigerant. Operation of the compressor 22 is controlled by the controller 30, as described in greater detail below. The compressor 22 includes a conventional clutch or other similar mechanism such that the rotation of the engine 18 selectively powers the compressor 22.

The compressor 22 is preferably powered by the engine 18 in a conventional manner, but can alternatively be powered by an electric motor (not shown) separate from the engine 18. The compressor 22 is fluidly connected to the condenser 24 and the evaporator 28 by refrigerant tubing in a conventional manner. The compressor 22 is configured to compress low pressure refrigerant received from the evaporator 28 and deliver high pressure refrigerant to the condenser 24.

It should be understood from the drawings and description herein that the compressor 22 can be any of a variety of types of compressors. For example, the compressor 22 can include a clutch mechanism (not shown) that is controlled by the controller 30, such that the controller 30 manages operation of the compressor by cycling the clutch between an engaged orientation (compressor on) and a dis-engaged orientation (compressor off). Hence, with this compressor configuration, the controller 30 manages the operation of the compressor 22 by cycling the compressor 22 on and off.

Alternatively, the compressor 22 can include an internal variable output control mechanism connected to the controller 30. In this alternative compressor configuration, the compressor 22 includes a main shaft that continuously rotates during operation of the air conditioning system 12. However, the controller 30 manages operation of the compressor 22 by adjusting the internal variable control mechanism of the compressor 22. In other words, the compressor 22 in this alternate configuration is operated continuously, and is not cycled completely on or off. Hence, in the following description of the various embodiments of the moisture releasing operation, when reference is made to cycling the compressor 22 on and off, the inventor can also be referring to cycling the compressor 22 between the high power consumption operation and the low power consumption operation, as defined in the paragraph above (i.e., the compressor 22 is not required to turn completely off).

The condenser 24 is fluidly coupled to the compressor 22 to receive the compressed refrigerant from the compressor 22 and dissipate heat therefrom in a conventional manner. The expansion device 26 is configured to throttle the refrigerant, allowing it to expand and thereby reducing pressure of the refrigerant as the refrigerant enters the evaporator 28. The evaporator 28 is fluidly coupled to the condenser 24 via the expansion device 26 to receive the expanded refrigerant from the condenser 24. The evaporator 28 is further configured to cool or absorb heat from air provided to the passenger compartment 14 and is further fluidly coupled to the compressor 22 to supply the refrigerant to the compressor 22. The compressor 22, the condenser 24, the expansion device 26 and the evaporator 28 are preferably conventional devices fluidly connected to one another by conventional high and low pressure refrigerant lines. Consequently, description of these conventional devices is omitted for the sake of brevity.

As best shown in FIGS. 2 and 3, the air conditioning system 12 also includes a blower 32 (FIG. 3 only), a temperature sensor 34, an ambient temperature sensor 36, a coolant temperature sensor 37 (FIG. 2 only), an air flow control door 38 (FIG. 3 only), a passenger compartment temperature sensor 40 and an optional passenger detection device 42. The controller 30 is operably connected to each of the temperature sensor 34, the ambient temperature sensor 36, the air flow control door 38, the passenger compartment temperature sensor 40 and the optional passenger detection device 42.

The following terms are used to assist in the understanding of the various embodiments of the air conditioning system 12. These terms are listed below with brief definitions.

The term "requested outlet temperature RO" refers to a temperature of air to be delivered to the passenger compartment 14. The requested outlet temperature RO corresponds to a setting of air conditioning controls (not shown) on the dashboard (not shown), which may be adjusted by a driver or passenger of the vehicle 10.

The term "moisture density threshold Ma" refers to a maximum desired humidity level within the vehicle 10. For instance, the moisture density threshold Ma can be a maximum permitted humidity level within the passenger compartment 14. In the air conditioning system 12, the moisture density threshold Ma is a maximum amount of humidity that is determined by the controller 30 to be acceptable in the passenger compartment 14 in order to avoid condensation of moisture on interior surfaces of the windows 16 and to maintain passenger comfort. In the air conditioning system 12, the moisture density threshold Ma is not a permanently fixed percentage of humidity in air, but is re-evaluated and adjusted continuously while the air conditioning system 12 is operating. The moisture density threshold Ma is determined as a function of one or more of the following: the requested or expected temperature and the relative humidity within the vehicle 10; the ambient temperature outside of the vehicle 10; and various operating parameters of the air conditioning system 12, as described below.

The term "basic cooling mode" refers to an air conditioning operating mode where the compressor 22 is operated such that air passing through the evaporator 28 is cooled using standard temperature cycling limits that typically maximize dehumidification of the passenger compartment 14.

The term "reduced load mode" is an operating mode where the compressor 22 is operated by the controller 30 with logic that reduces the overall energy consumption of the compressor 22 when compared to conventional modes of operation of the air conditioning system 12. The compressor 22 is cycled on and off in order to maintain the temperature within the passenger compartment 14, but the cycling of the compressor 22 is determined at least in part by estimating the level of humidity proximate the evaporator 28. More specifically, the operation of the compressor 22 is controlled to maintain the humidity within the passenger compartment 14 at or below the moisture density threshold Ma.

The term "transition mode" refers to a mode of operation controlled by logic of the controller 30 as it operates the compressor 22. In the transition mode, an estimated moisture content at the evaporator 28 (and hence the passenger compartment 14) is maintained at or below the moisture density threshold Ma as the logic of the controller 30 operates the compressor 22 between the basic cooling mode and the reduced load mode. Further, during the transition mode, the evaporator 28 is preferably maintained at a temperature such that the evaporator 28 is dried out or partially dried out to reduce the overall amount of condensation on the cooling surfaces of the evaporator 28.

The term "upper evaporator control limit UCL" is a temperature that triggers the controller 30 to turn on the compressor 22. More specifically, the temperature is measured by the temperature sensor 34 located proximate the evaporator 28. When the measured temperature at the evaporator 28 is equal to or greater than the upper evaporator control limit UCL, the controller 30 has logic that turns the compressor 22 on. The upper evaporator control limit UCL is a temperature that is based on an evaluation and continuing re-evaluation of various parameters of the air conditioning system 12 and is therefore not necessarily a fixed value.

The term "lower evaporator control limit LCL" is a temperature that triggers the controller 30 to turn off the compressor 22. The lower evaporator control limit LCL is a temperature that is based on an evaluation and continuing re-evaluation of various parameters of the air conditioning system 12 and is therefore not necessarily a fixed value. The lower evaporator control limit LCL and the upper evaporator control limit UCL define cycling limits for operation of the compressor 22 when the air conditioning system 12 operates in the reduced load mode.

The term "required evaporator temperature RE" is a temperature level that is continuously adjusted by the controller 30 in order to achieve compressor temperature cycling limits in response to estimated moisture levels at the evaporator 28. The required evaporator temperature RE is used by the controller 30 to determine the lower evaporator control limit LCL and the upper evaporator control limit UCL. The required evaporator temperature RE is not a fixed temperature but rather is a temperature level that is re-evaluated and re-set by the controller 30, as described in greater detail below.

The term "passenger moisture contributions mPass" is defined as the anticipated moisture contributed by passengers in the vehicle 10 via perspiration and/or breathing. People generally lose moisture as they breathe, in particular in an atmosphere such as a cooled air conditioned space.

The term "comfort level humidity Cmfl" is defined as a level of humidity within the passenger compartment 14 that should be comfortable to a passenger or passengers.

The term "estimated moisture density $E_{Den}$" refers to an estimated moisture density at the evaporator 28. Specifically, the temperature sensor 34 measures the temperature of air that has been cooled by the evaporator 28. There is no humidity sensor present at, or, near the evaporator 28 in the first, second and third embodiments, described below. Therefore, the moisture density of the air cooled by the evaporator 28 is estimated as a function of the measured temperature of the air that has been cooled by the evaporator 28 and correlation data, as is described in greater detail below.

It should be understood from the drawings and the description herein, that all temperatures and degrees in the following description are measured in Celsius or centigrade (° C.) unless otherwise stated.

Returning now to a description of the air conditioning system 12, the blower 32 (as shown in FIG. 3) is configured to draw air from outside the vehicle 10 via duct 44 and air from the passenger compartment 14 via duct 46. A door (not shown) can block or restrict outside air from entering via the duct 44. The blower 32 is further configured to move air along the heat exchanging surfaces of the evaporator 28 in a conventional manner. The blower 32 is operated by a fan switch (not shown) that is adjusted by a vehicle passenger or can alternatively be controlled by the controller 30 (e.g., via an automatic climate control mode). The air force generated by the blower 32 further causes air to move past the temperature sensor 34, toward the air flow control door 38 and through a heater core 52 (depending upon the orientation of the air flow control door 38) and further through a duct 48 back to the passenger compartment 14, as indicated in FIG. 3.

The temperature sensor 34 is preferably positioned at a downstream side of the evaporator 28 (relative to the direction of air blown by the blower 32) between the evaporator 28 and the heater core 52. More specifically, the temperature sensor 34 is located downstream from the evaporator 28 but upstream from the heater core 52. The temperature sensor 34 is configured to detect the temperature of cooled air that passes through the evaporator 28. The temperature sensor 34 can be positioned on the evaporator 28 or can be spaced apart from the evaporator 28, as indicated in FIG. 3. Preferably, the temperature sensor 34 is positioned close to or proximate the evaporator 28. Preferably, the temperature sensor 34 is positioned to measure the temperature at the evaporator 28, at all speeds of the operation of the blower 32.

The temperature sensor 34 is connected to the controller 30 so that the controller 30 can continuously monitor the temperature of air that is cooled by the evaporator 28. Preferably, the temperature sensor 34 is positioned so that temperatures measured by the temperature sensor 34 are useful in determining the estimated humidity level (moisture density) proximate the evaporator 28, as is described in greater detail below.

The ambient temperature sensor 36 is preferably located on the vehicle 10 such that the ambient or outdoor temperature (outside the vehicle 10) is measured. The ambient temperature sensor 36 is therefore preferably located outside of the passenger compartment 14. As described further below, one purpose of the ambient temperature sensor 36 is to provide an indication of the temperature on outer surfaces of the windows 16 so that the controller 30 can determine a temperature at which condensation is likely to occur on inner surfaces of the windows 16.

The air flow control door 38 is preferably located downstream from the evaporator 28 at the opening of a duct 50 that houses the heater core 52. The heater core 52 is a conventional element that is provided with heated coolant from the engine 18 (or an alternative heat source) in a conventional manner. The air flow control door 38 is a pivoting member that is configured to selectively divert a predetermined amount of the air cooled by the evaporator 28 and pass that portion of cooled air through the heater core 52. The air passing through the heater core 52 is heated and then mixes with the cooled air in the duct 48 prior to entering the passenger compartment 14. The air flow control door 38 can be pivoted so that all of the air from the evaporator 28 passes through the heater core 52 such as when heat is required in the passenger compartment 14.

The air flow control door 38, the duct 50 and the heater core 52 define an air mixing assembly. Mixing of air by control of the position of the air flow control door 38 provides a means for ensuring that the passenger compartment 14 is maintained at the requested outlet temperature RO when the air conditioning system 12 is operating. The air flow control door 38 includes a conventional positioning device (not shown) such as an electric stepper motor that is operated by the controller 30.

The passenger compartment temperature sensor 40 is connected to the controller 30 and provides a measurement of the temperature in the passenger compartment 14. The passenger compartment temperature sensor 40 is preferably located within the passenger compartment 14 but can alternatively be located in, for example, the duct 46, measuring the temperature of air drawn out of the passenger compartment 14.

The optional passenger detection device 42 is a device that detects the presence of a passenger within the passenger compartment 14. The passenger detection device 42 can be, for example, a seat occupancy switch (not shown) used by an airbag arming system that detects whether or not a passenger is seated in the seat. Alternatively, the passenger detection device 42 can be a device that detects the presence of a passenger or passengers using a sonic or optical detection device. The passenger detection device 42 is connected to the controller 30 so that the controller 30 can determine the potential moisture emissions of a passenger or passengers, as described below.

It should be understood from the drawings and description herein that the passenger detection device 42 is an optional device and is not a required element of the air conditioning system 12. For instance, if the passenger detection device 42 is omitted, the controller 30 can be programmed to automatically assume the presence of one or more passengers in addition to the vehicle operator.

The controller 30 is programmed and configured to control operation of the compressor 22 in order to balance at least the following objectives: first, achieve passenger demands for cool air in the passenger compartment 14; second, reduce condensation or fogging of the windows 16; third, reduce overly rapid moisture release from the evaporator 28 in order to prevent unpleasant odor within the passenger compartment 14 when elevating the temperature of the evaporator 28 and/or the passenger compartment 14; and fourth, minimize operation of the compressor 22 in order to increase fuel economy.

The controller 30 is configured or programmed to achieve the above objectives. For example, the controller 30 employs an air blending adjustment logic that manages the transitions of the evaporator temperature in order to maintain a target outlet temperature from the duct 48 entering the passenger compartment 14, as described below. The logic used by the controller 30 minimizes the amount of air passing through the evaporator 26 that is reheated by the heater core 52. In other words, the logic used by the controller 30 strives to minimize the amount of air that the air flow control door 38 diverts through the heater core 52. Consequently, the air mixing assembly (the air flow control door 38, the duct 50 and the heater core 52) is configured to selectively divert a minimal portion of the air passing through the evaporator 28 to the heater core 52. The controller 30 is operatively coupled to the air mixing assembly to control an amount of the air cooled by the evaporator 28 that is diverted through the heater core 52 to attain a predetermined temperature range within the passenger compartment 14.

The controller 30 stores correlation data and is connected to the temperature sensor 34. As is described in greater detail below, the controller 30 constantly receives temperature measurement signals from the temperature sensor 34 and uses the most current measurement to determine an estimated moisture density at the evaporator 28 based on the correlation data. The correlation data stored in the controller 30 can be in the form of a Saturation Table that correlates specific temperatures to estimated moisture density levels corresponding to 100% relative humidity at the listed temperatures. An example of such a Saturation Table (a moisture density table) is provided below in Table 1. Table 1 can be used by the controller 30 to estimate the moisture density of the air that passes through the evaporator 28. Specifically, the cooled air that passes through the evaporator 28 has a portion of its moisture content removed during the process of being cooled by the evaporator 28. A portion of the moisture in the air condenses on the surfaces of the evaporator 28 and is drained out of the vehicle 10 in a conventional manner. For operation of the air conditioning system 12 described herein, the cooled air leaving the evaporator 28 is assumed to have a relative humidity at the temperature measured by the temperature sensor 34 of approximately 100%.

TABLE 1

Saturation Table

| Temperature (° C.) | Estimated Moisture Density At 100% Relative Humidity (g/m$^3$) |
|---|---|
| −15 | 1.39 |
| −10 | 2.15 |
| −5 | 3.26 |
| 0 | 4.86 |
| 5 | 6.81 |
| 10 | 9.42 |
| 15 | 12.86 |
| 20 | 17.33 |
| 25 | 23.1 |
| 30 | 30.44 |
| 35 | 39.7 |

Table 1 (above) is provided with data at 5 degree increments. Data relating to the moisture density levels at various temperatures and various levels of relative humidity are well known and widely available. Table 1 is merely an abbreviation of the possible correlation data that can be stored in the controller 30. It should be understood from the drawings and the description herein, that the data in Table 1 can be far more detailed and extensive, if necessary. For example, depending upon the design of the vehicle 10 and/or the capacity and configuration of the air conditioning system 12, Table 1 can include moisture density data at 2 degree increments, 1 degree increments, or even at one half-degree increments and so on.

The controller 30 monitors the temperature measured by the temperature sensor 34 at predetermined intervals, for example, such as every 100 milliseconds or less frequently, such as every 5 seconds. Therefore, using the temperature reading at the evaporator 28, the controller 30 can determine an estimated moisture density (in grams per cubic meter) at the evaporator 28 in order to control cycling of the compressor 22 and thereby control the amount of moisture delivered to the passenger compartment 14. Specifically, the controller 30 receives the temperature at the evaporator 28 as measured by the temperature sensor 34. The controller 30 then looks to the data in Table 1 and correlates the measured temperature at the evaporator 28 to the estimated moisture density listed at that temperature in Table 1 and stores it as the estimated moisture density $E_{Den}$. The estimated moisture density $E_{Den}$ is thereafter used to control the compressor 22, as is described in greater detail below.

In one embodiment of the air conditioning system 12, the ambient temperature outside the vehicle 10 is measured by the ambient temperature sensor 36 and monitored by the controller 30 such that the controller 30 calculates the moisture density at which fog or condensation will potentially form on the windows 14. The controller 30 makes use of the measured temperature at the evaporator 28 and the measured ambient temperature to control the compressor 22.

The controller 30 controls operation of the compressor 22 so that it can provide enough cooling to satisfy the passenger cooling requirements within the passenger compartment 14 and provide humidity control in order to minimize the amount of moisture removed from cooled air passing over heat exchanging surfaces of the evaporator 28 while still maintaining the humidity level low enough to prevent fogging on the windows 16 and reduce or eliminate unpleasant odors from the evaporator 28. Optimization of compressor operation can reduce overall compressor operation and favorably impacts fuel economy since the engine 18 consequently expends less energy powering the compressor 22.

The controller 30 is operably connected to the temperature sensor 34 and the compressor 22 in order to turn the compressor 22 on and off in a manner mentioned above and described in greater detail below. More specifically, the controller 30 is configured to maintain an estimated moisture density of the air cooled by the evaporator 28 and provided to the passenger compartment below the predetermined moisture density threshold Ma.

The controller 30 is also operatively coupled to the ambient temperature sensor 36. The ambient temperature sensor 36 is configured to measure outside air temperature and sends that temperature measurement to the controller 30.

Figure 5:
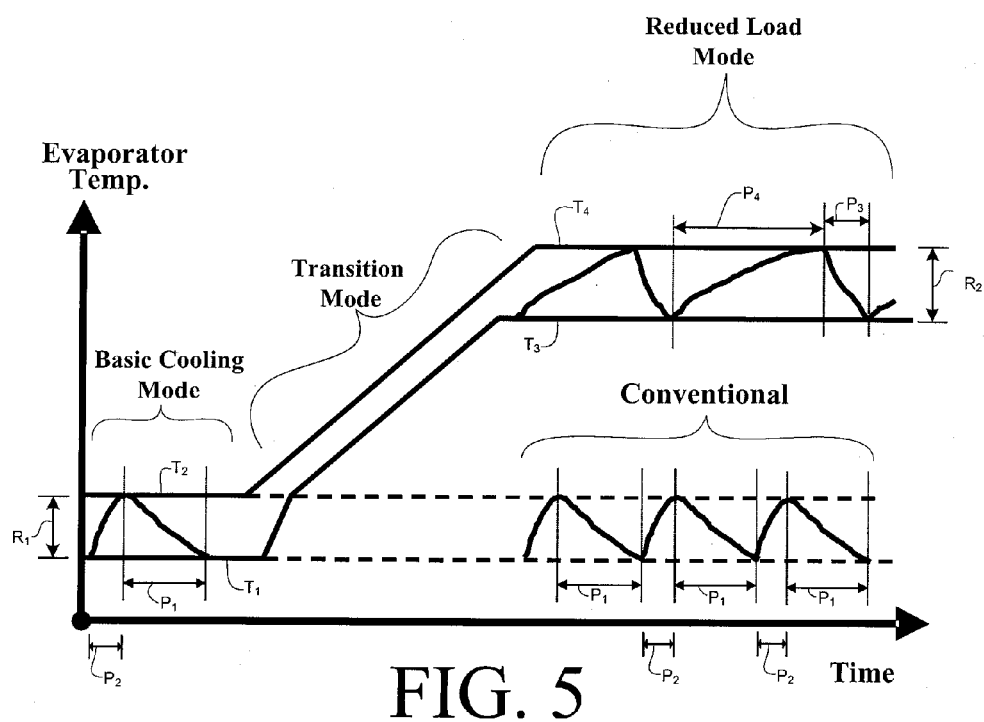
FIG. 5 is a chart showing evaporator temperature and compressor operation over time in a basic cooling mode, a transition mode and a reduced load mode in accordance with the first embodiment.

The moisture density threshold Ma is determined based upon several possible parameters, as described below. The controller 30 initially determines or sets the moisture density threshold Ma based on the outside temperature in order to prevent or minimize window condensation and based on the comfort level humidity Cmfl. Specifically, the controller 30 is configured to operate the compressor 22 in such a way that keeps the evaporator 28 at a temperature capable of condensing enough moisture to prevent fogging on the inner surfaces of the windows 16 and maintain humidity levels at or below the comfort level humidity Cmfl, even though the overall evaporator temperatures are higher than in a conventional vehicle air conditioning system, as indicated in FIG. 5.

The controller 30 is preferably pre-programmed with data tables that provide condensation conditions for specific temperature differentials. Specifically, the controller 30 includes data that enables it to correlate temperatures inside the passenger compartment 14 with temperatures outside the vehicle 10 (the ambient temperature sensor 36) and determine the approximate humidity level (and/or corresponding moisture density) at which condensation will likely occur. For instance, meteorologists have determined the dew points for various temperature and atmospheric conditions and supply such information seasonally in weather forecasts. Similar information is stored in memory within the controller 30 such that once the ambient temperature outside the vehicle 10 has been measured by the ambient temperature sensor 36, the controller 30 uses the temperature information to determine the humidity level at which condensation or fogging will likely occur on the inner surfaces of the windows 16 within the passenger compartment 14 at the requested outlet temperature RO.

The controller 30 can additionally determine or set the moisture density threshold Ma in response to estimated passenger moisture generation. For example, the controller 30 can be programmed to assume that through breathing and perspiration, the average passenger contributes an anticipated quantity of moisture to the air within the passenger compartment 14. The moisture density threshold Ma is modified by the controller 30 based upon passenger moisture generation assumptions, which are stored as data in memory within the controller 30.

Alternatively, the controller 30 can be operably coupled to the optional passenger detection device 42 that detects the presence of at least one passenger or a group of passengers. The controller 30 is configured to determine passenger moisture contribution levels and modify or calculate the moisture density threshold Ma based upon the detected presence of one or more passengers.

The logic within the controller 30 can be arranged and implemented in a variety of ways, as demonstrated in the following embodiments. In the embodiments described below, the controller 30 basically includes logic that allows the air conditioning system 12 to operate in three cooling operating modes: the basic cooling mode, the transition mode and the reduced load mode. The basic cooling mode includes reducing the temperature of air within the passenger compartment 14 from a high temperature above the requested outlet temperature RO to or below the requested outlet temperature RO. The controller 30 checks readings from the temperature sensor 34 and the passenger operated temperature control panel and determines whether or not the passenger compartment 14 needs colder air. The controller 30 then operates the compressor 22 in the basic cooling mode where the evaporator 28 is allowed to absorb a maximum amount of heat from air prior to blowing the air into the passenger compartment 14. Control of the compressor 22 in the basic cooling mode is done in response to achieving a specific refrigerant pressure within the evaporator 28 or achieving a specific temperature, typically near 0° C., at the evaporator 28, as represented in FIG. 5.

When the requested outlet temperature RO exceeds the evaporator's compressor-on temperature, the air conditioning system 12 operates in the transition mode for a brief time where a portion of condensed moisture on or around the evaporator 28 is allowed to slowly vaporize until the controller 30 determines that the estimated humidity level at the evaporator 28 has reached the moisture density threshold Ma. Thereafter, the controller 30 operates the air conditioning system 12 in the reduced load mode of operation. In the reduced load mode of operation, the compressor 22 is cycled on and off to maintain the moisture density of air at the evaporator 28, as estimated based on readings from the temperature sensor 34, at or below a moisture density threshold Ma (and at or below the comfort humidity level Cmfl), as described in greater detail below. Unlike conventional air conditioning systems, in the reduced load mode of operation, the compressor 22 is operated in order to achieve a specific moisture density at the evaporator 28.

First Embodiment

Figure 4:
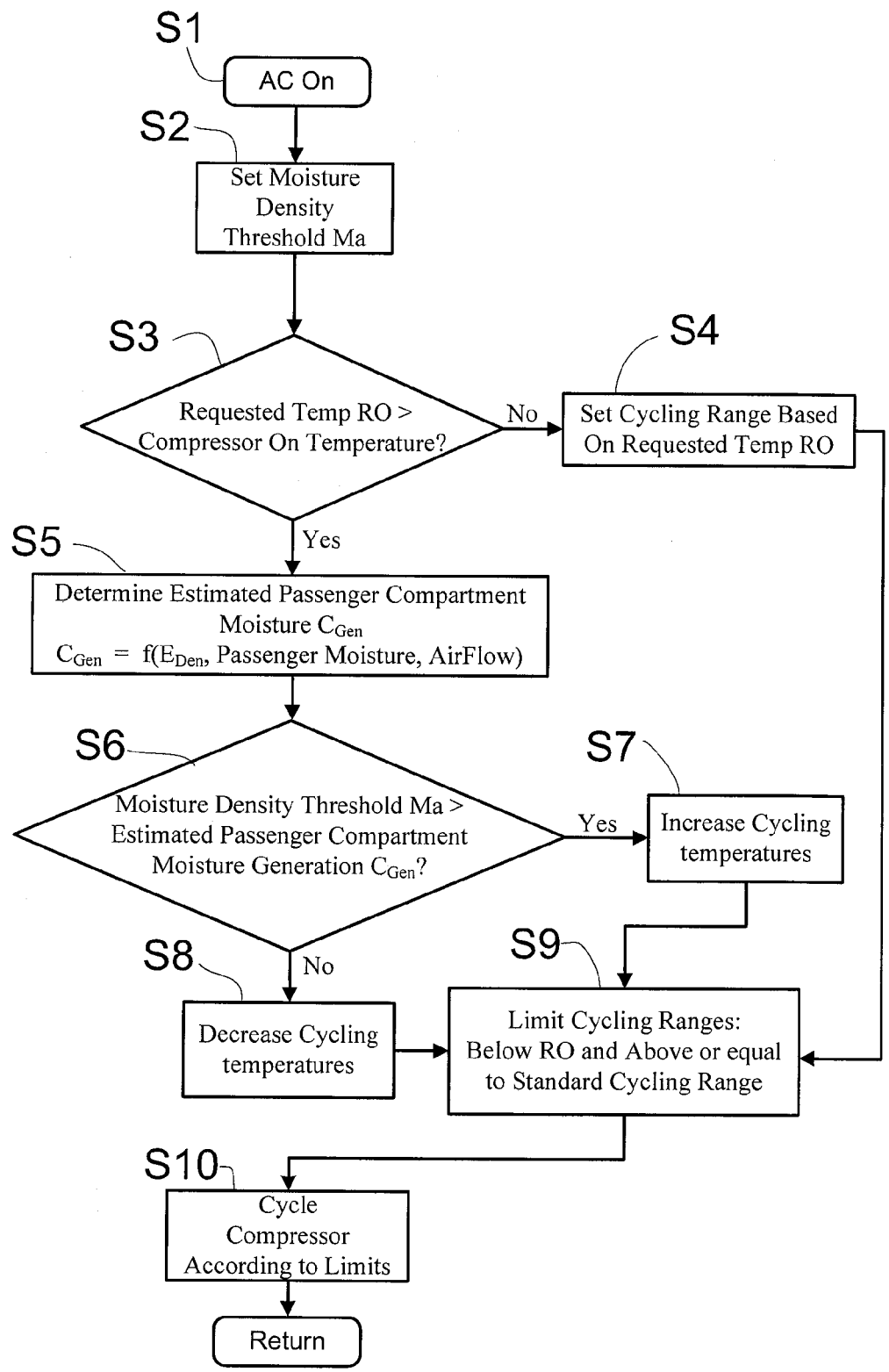
FIG. 4 is a flowchart showing basic steps of operation of the air conditioning system in accordance with the first embodiment.

Referring now to FIGS. 4 and 5, operational steps in accordance with a first embodiment of the present invention will now be explained. In the first embodiment, the controller 30 is programmed or includes circuitry that enables operation of the compressor 22 including the basic steps described below. It should be understood from the drawings and the description below, that the depiction in FIG. 4 shows basic operational steps that can be implemented in a variety of ways. The first embodiment is one example of operation of the air conditioning system 12 by the controller 30.

At step S1, the air conditioning system 12 is switched on along with the blower 32 and, initially, the air conditioning system 12 operates in the basic cooling mode with predetermined temperature cycling limits. The controller 30 determines the requested outlet temperature RO. If the requested outlet temperature RO does not exceed the compressor-on temperature, the controller 30 continues to engage the compressor 22 to cycle on and off in order to remove heat from the passenger compartment 14 in the basic cooling mode. When first starting up or being turned on after previously being turned off, the controller 30 operates the compressor 22 in the basic cooling mode in order to remove heat and potentially residual cabin moisture from the passenger compartment 14 as quickly as possible. The controller 30 also checks the temperature measured by the ambient temperature sensor 36 to determine temperatures outside the vehicle 10. Using the temperature outside the vehicle 10, the controller 30 also determines an initial moisture density threshold Ma that includes consideration of a pre-set comfort level humidity.

As indicated in FIG. 5, in the basic cooling mode the compressor 22 is operated to maintain the evaporator 28 within standard temperature cycling limits, such as a first temperature range $R_1$ having a lower temperature limit $T_1$ and an upper temperature limit $T_2$. The lower temperature limit $T_1$ is preferably just above the freezing point of water. The upper temperature limit $T_2$ is typically 3-5 degrees above the lower temperature limit $T_1$ but is variable depending upon the size of the vehicle 10, the capacity of the air conditioning system 12 and the size of the passenger compartment 14.

It should be understood that the lower temperature limit $T_1$ and the upper temperature limit $T_2$ can be attained by monitoring the temperature proximate the evaporator 28 via readings from the temperature sensor 34. Alternatively, the cycling of the compressor 22 can be achieved in a similar manner by monitoring the refrigerant pressure within the evaporator 28. Regardless, the requested outlet temperature RO is maintained typically by reheating portions of cooled air in the basic cooling mode.

At step S1, the various parameters of the air conditioning system 12 are also checked by the controller 30. Specifically, the temperature sensor 34, the ambient temperature sensor 36 and the passenger compartment temperature sensor 40 provide signals to the controller 30 indicating the temperature of air downstream from the evaporator 28, the ambient temperature outside the vehicle 10 and the temperature within the passenger compartment 14.

At step S2, the controller 30 evaluates the moisture density threshold Ma. Specifically, the controller 30 monitors all sensors, and in particular, the ambient temperature sensor 36 to determine the outside temperature. The controller 30 computes the moisture density threshold Ma based upon the anticipated outside temperature at which condensation may occur on the windows 16, but can adjust the measured ambient temperature in anticipation of passenger compartment glass being slightly warmer than the ambient temperature outside the vehicle 10. Additionally, an ideal temperature and humidity content associated with a comfortable passenger compartment 14 is estimated. The value of Ma is set to the lesser of the two moisture content estimates (to avoid becoming too humid in the cabin, creating either discomfort or window fogging) for subsequent processing.

At step S3, the controller 30 checks to see if the requested outlet temperature RO is less than the compressor "on" temperature (the temperature $T_2$ in the basic cooling mode, the temperature $T_4$ in the reduced load mode). If the requested outlet temperature RO is not greater than the compressor "on" temperature RO, the compressor "on" temperature is adjusted to match the requested outlet temperature RO (with the compressor "off" temperature following with a typical hysteresis offset) as indicated at step S4. Thereafter, operations go to step S9. If the requested outlet temperature RO is greater than the compressor "on" temperature RO, operation moves to step S5.

At step S5, the controller 30 determines the variable $E_{Den}$, which represents the estimated moisture density given the current temperature of the evaporator 28. Specifically, the controller 30 uses the temperature reading to look up a corresponding estimated moisture density at the evaporation 28 using the correlation data (for example, Table 1 above) and defines the variable $E_{Den}$. The controller 30 determines or estimates the number of passengers within the vehicle 10 using either sensors or predetermined data stored in the controller 30. The controller 30 further includes stored constants representing the approximate amount of moisture generated per passenger. The controller 30 then determines the speed of the blower 32, which provides an estimation of the air flow through the passenger compartment 14. The controller 30 then uses the variable $E_{Den}$, the approximated amount of moisture produced by passengers within the vehicle 10 and the estimated air flow through the passenger compartment 14 to determine a variable $C_{Gen}$, which represents an estimated amount of moisture generated in the passenger compartment 14.

At step S6, the moisture density threshold Ma is compared to the variable $C_{Gen}$ determined in step S5. If the moisture density threshold Ma is greater than the estimated moisture generated in the passenger compartment 14 $C_{Gen}$, then the cycling temperatures are increased from the range $R_1$ to, for example, the range $R_2$ as indicated at step S7 and in FIG. 5. As the evaporator 28 is allowed to increase in temperature, moisture begins to evaporate from heat exchanging surfaces of the evaporator 28. After step S7, operation moves to step S9, as described further below.

At step S6, if the moisture density threshold Ma is not greater than the estimated amount passenger compartment moisture generation $C_{Gen}$, then operations move to step S8. At step S8, the cycling temperatures are decreased. At step S9, the cycling ranges are limited to being below the requested outlet temperature RO and above or equal to the standard cycling range $R_1$. It is within the steps S6, S7, S8 and S9 that the controller 30 begins to operate in the reduced load mode. Specifically, the estimated moisture density of air at the evaporator 28 is monitored and plays a large part in determining cycling operation of the compressor 30, as described below.

In the reduced load mode, the controller 30 cycles through steps S2, S3, S4, S6, S7, S8, S9 and S10, as depicted in FIG. 4. The compressor 22 is cycled on and off in order to maintain the estimated moisture density of air downstream from the evaporator 28 at or below the moisture density threshold Ma. As a result, the temperature of air at the evaporator 28 typically falls within the second temperature range $R_2$, having a lower temperature limit $T_3$ and an upper temperature limit $T_4$, as indicated in FIG. 5. The lower temperature limit $T_3$ represents an example of a lower evaporator control limit and the upper temperature limit $T_4$ represents an example of an upper evaporator control limit.

The temperatures associated with the temperature range $R_2$ are higher than those associated with the temperature range $R_1$. Specifically, the lower temperature limit $T_3$ is higher than the lower temperature limit $T_1$ and the upper temperature limit $T_4$ is higher than the upper temperature limit $T_2$, as indicated in FIG. 5. The lower temperature limit $T_3$ can be lower or higher than the upper temperature limit $T_2$ depending upon operating parameters and the ambient weather conditions.

Since the evaporator 28 is maintained at higher temperatures within the temperature range $R_2$ while operating in the reduced load mode, the compressor 22 does not operate as often or need to work as hard compared to the basic cooling mode.

The basic cooling mode of the present invention is similar to conventional operating modes for conventional air conditioning systems, as indicated in the lower right hand portion of FIG. 5. However, the reduced load mode of the present invention using the moisture density threshold Ma and an estimated moisture density $E_{Den}$ at the evaporator 28 to control compressor operation provides noticeable advantages over the conventional operating mode. For example, in the basic cooling mode and in conventional operating modes, the inventor observed that the compressor 22 operates for time periods $P_1$ and remains off for time periods $P_2$. This cycling of the compressor 22 on and off for time periods $P_1$ and $P_2$ indicates overall power consumption. However, in the reduced load mode, the controller 30 operates the compressor 22 for time periods $P_3$ and turns the compressor 22 off for time periods $P_4$. As shown in FIG. 5, the time period $P_1$ is longer than the time period $P_3$ and the time period $P_2$ is shorter than the time period $P_4$. Consequently, in the basic cooling mode and in conventional operating modes, the compressor 22 is on more frequently and for longer cycling intervals than in the reduced load mode of the present invention.

Second Embodiment

Figure 6:
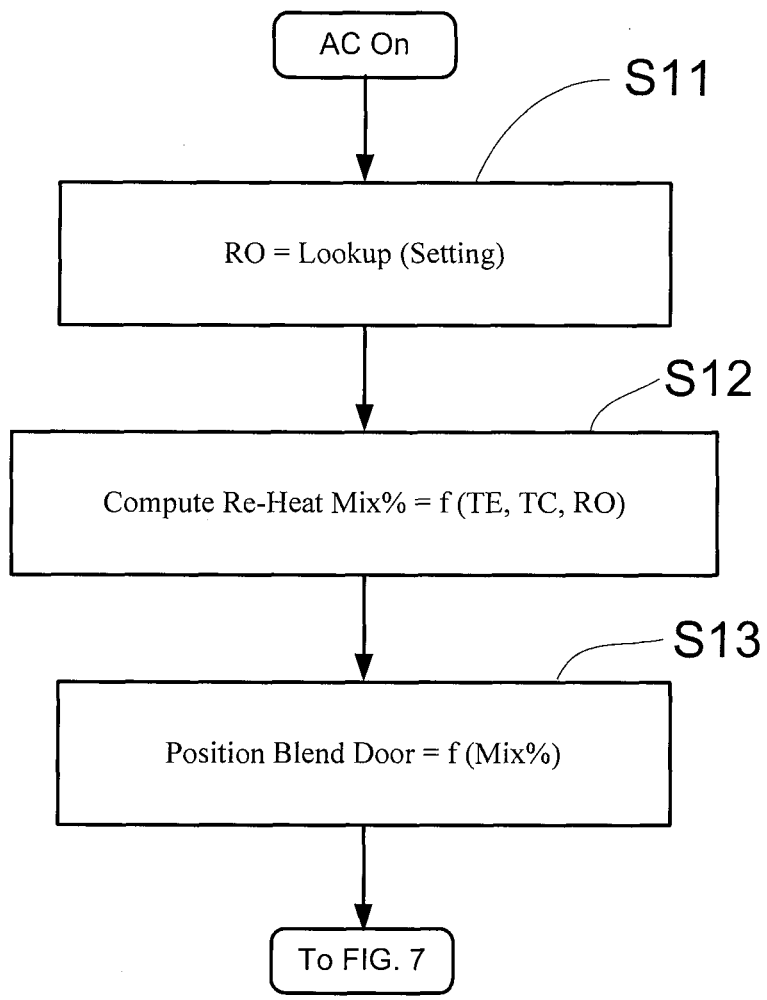
FIG. 6 is first flowchart showing an example of operational steps effected by the controller for controlling the heater core mixing portion in accordance with a second embodiment.
Figure 7:
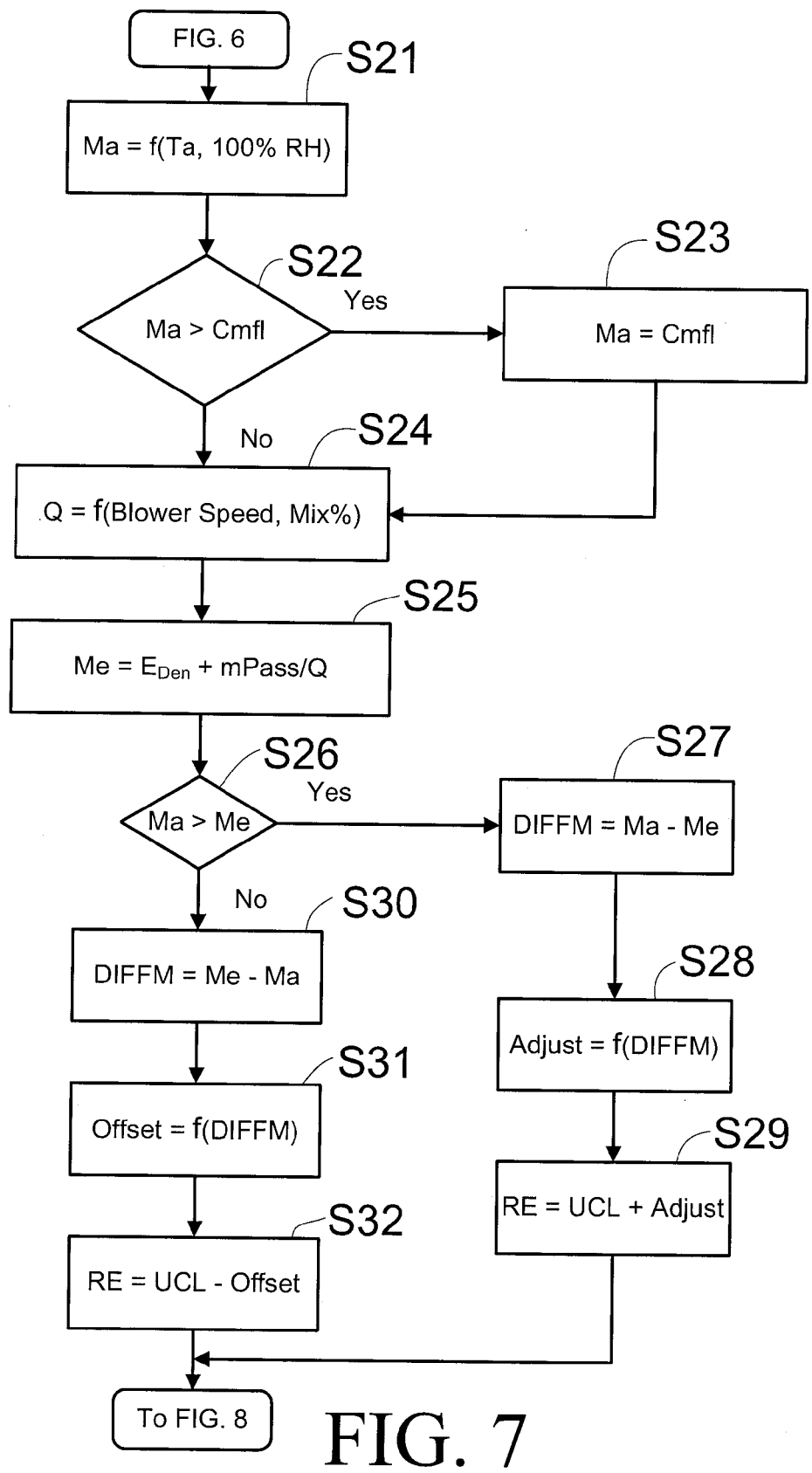
FIG. 7 is a second flowchart showing an example of operational steps effected by the controller for determining a moisture density threshold in accordance with the second embodiment.
Figure 8:
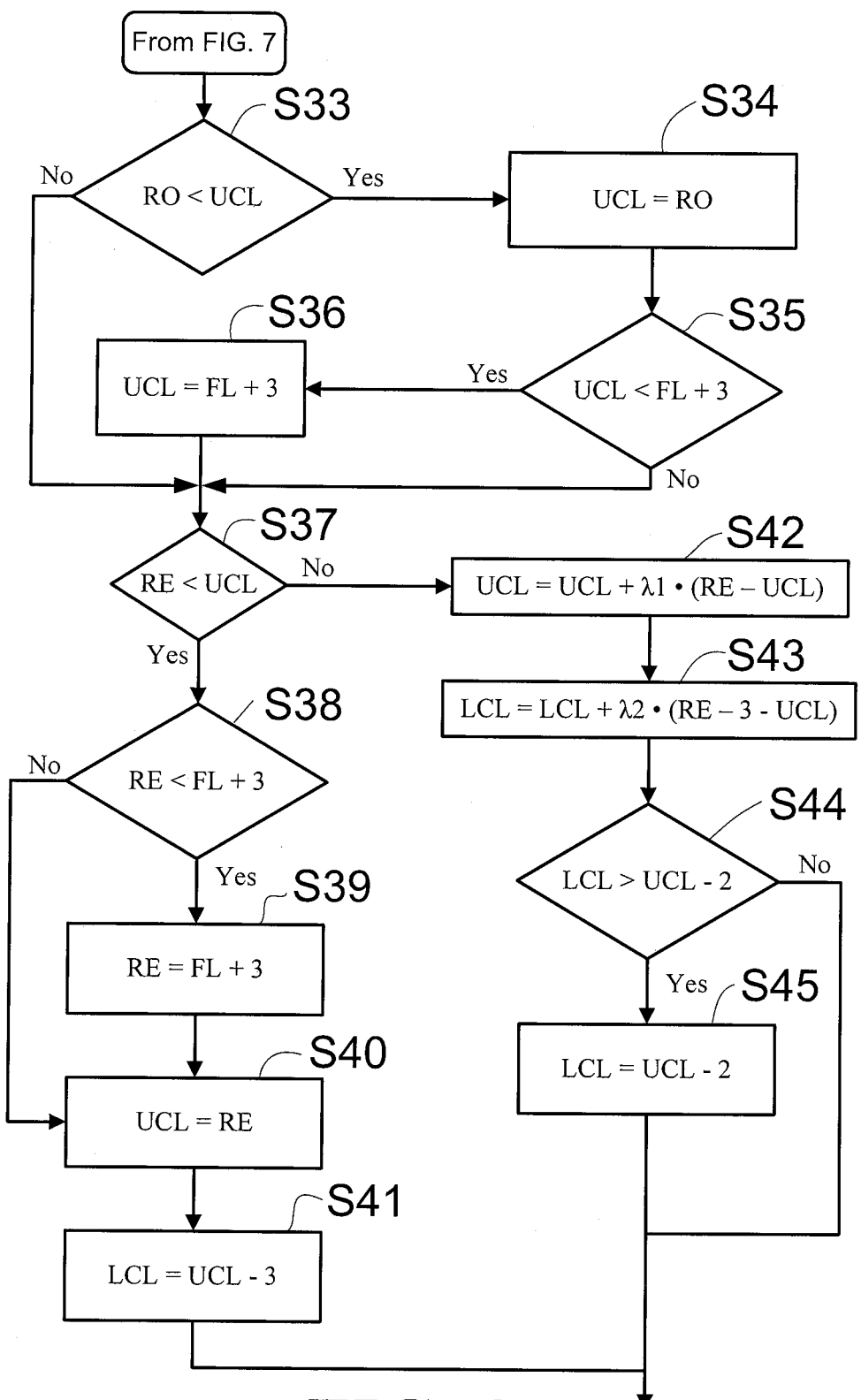
FIG. 8 is third flowchart showing an example of operational steps effected by the controller for operating the compressor in accordance with the second embodiment.

Referring now to FIGS. 6, 7 and 8, operational steps in accordance with a second embodiment of the present invention will now be explained. In the second embodiment, the controller 30 is programmed or includes circuitry that enables operation of the compressor 22 including the basic steps described below. The second embodiment is another example of operation of the air conditioning system 12 by the controller 30.

In the second embodiment, the controller 30 operates the compressor 22 in a basic cooling mode, a transition mode and a reduced load mode, as described in greater detail below. In the second embodiment, the controller 30 is also programmed to control the positioning of the air flow control door 38.

As described above with respect to the first embodiment, in the basic cooling mode, the controller 30 typically cycles the compressor 22 on and off in order to remove heat as smoothly and rapidly as possible from air entering the passenger compartment 14. Since the basic cooling mode is a conventional mode of operation, description of the basic cooling mode is minimal for the sake of brevity.

FIG. 6 shows basic steps of the controller 30 for establishing and then maintaining the requested outlet temperature RO within the passenger compartment 14. Several variables used in the course of maintaining the requested outlet temperatures RO are also repeatedly updated during operation of the air conditioning system 12 and are presented in the flowchart in FIG. 6. The operational steps depicted in FIG. 6 are conducted during all three operational modes, the basic cooling mode, the transition mode and the reduced load mode.

At step S11 in the flowchart depicted in FIG. 6, the controller 30 checks the requested outlet temperature RO, as established by the driver or passenger requesting a specific temperature for the passenger compartment 14. The requested outlet temperature RO is typically set manually by the driver or passenger using air conditioning operation controls within the passenger compartment 14, in a conventional manner. At step S12, the controller 30 then calculates or determines the position of the air flow control door 38. The controller 30 determines a desired position for the air flow control door 38 by evaluating several factors, such as: the temperature Te downstream from the evaporator 28 as measured by the temperature sensor 34 (but upstream from the heater core 52); the coolant temperature TC of the engine 18 and the heater core 52; and the requested outlet temperature RO.

At step S13, the controller 30 sends signals to the air flow control door 38 corresponding to the computed position. The percentage of cooled air re-heated by diverting it through the heater core 52 varies depending upon weather conditions and vehicle conditions and is continuously recalculated by the controller 30.

Turning now to FIG. 7, further processes executed by the controller 30 are described. Specifically, FIG. 7 shows, among other things, the basic steps for determining the moisture density threshold Ma along with initial settings for the lower evaporator control limit LCL and the upper evaporator control limit UCL for use in both the transition mode and the reduced load mode.

At step S21 the controller 30 determines an initial level for the moisture density threshold Ma. The setting of the moisture density threshold Ma is initially determined based on or as a function of the ambient air temperature Ta measured by the ambient temperature sensor 36 given an assumed 100 percent relative humidity RH. More specifically, the moisture density threshold Ma is initially set to be at a level where condensation is most likely to begin accumulating on the windows 16 of the passenger compartment 14. The controller 30 can also upwardly adjust the measured ambient air temperature Ta based on the assumption that internal surfaces of passenger compartment glass will be warmer than the measured ambient air temperature Ta. The correlation data in Table 1 (above) can be used to determine the value of the moisture density threshold Ma using the temperature measured by the ambient temperature sensor 36 (and possibly adjusted slightly upward by the controller 30). It should be understood from basic meteorology principles that relative humidity RH changes along with changes in temperature. Therefore, the ambient air temperature Ta is continuously measured and updated by the ambient temperature sensor 36.

At step S22 in FIG. 7, the controller 30 compares the moisture density threshold Ma with a comfort level humidity Cmfl. The comfort level humidity Cmfl is an established level of absolute humidity (or moisture density) identified as being comfortable for vehicle passengers given particular conditions, such as a specific temperature within the passenger compartment 14. It should be understood from the description and drawings herein that the term comfortable is a relative term. Table 2, below, is merely one example of data that can be used to determine the comfort level humidity Cmfl. The data in Table 2 is tabulated for an assumed 50% relative humidity at example temperatures that are established by occupants as a desired temperature (i.e., requested outlet temperature RO) for the passenger compartment 14. However, the 50% relative humidity benchmark can be adjusted or changed depending upon the vehicle and/or manufacturer preference regarding perception of passenger comfort.

Table 2, below, tabulates example moisture densities resulting in an assumed comfort level and are associated with a 50% relative humidity at each of the listed temperatures. The moisture density on the right side of Table 2 is used as one possible source for the value assigned to the variable Cmfl in the logic described below. Specifically, a variable representing comfort level humidity Cmfl (stored as a moisture density in grams per cubic meter) is defined in Table 2 for the second embodiment. However, it should be understood that, although the data in Table 2 is presented in five degree increments, the actual data stored in the controller 30 can be in one degree increments or in smaller increments depending upon the vehicle 10 and/or the capacity and sophistication of the air conditioning system 12.

TABLE 2

| Temperature (° C.) | Moisture Density Cmfl (g/m³) at 50% Relative Humidity |
|---|---|
| −15 | 0.7 |
| −10 | 1.07 |
| −5 | 1.63 |
| 0.0 | 2.43 |
| 5 | 3.41 |
| 10 | 4.71 |
| 15 | 6.43 |
| 20 | 8.67 |
| 25 | 11.55 |
| 30 | 15.22 |
| 35 | 19.85 |

It should be understood from the description and drawings herein, that the control of the air conditioning system 12 will likely include achieving and maintaining temperatures within the passenger compartment 14 between 15° C. and 30° C. However, the expanded data in Table 2 is provided to show a wider range of moisture density levels resulting at different temperatures with an assumed relative humidity of 50%.

It should also be understood that in some vehicles, such as a luxury vehicle, a humidity adjustment mechanism can be provided such that the comfort level humidity Cmfl is independently adjustable by a vehicle passenger. Therefore, it is possible for the variable Cmfl to be established by a passenger, which would bypass the use of Table 2. However, in most anticipated applications of the present invention, the comfort level humidity Cmfl is based upon preset values stored in memory within the controller 30, such as those shown in Table 2.

At step S22, if the controller 30 determines that the moisture density threshold Ma is larger than the comfort level humidity Cmfl, then the moisture density threshold Ma is re-set to be the comfort level humidity Cmfl at step S23 in order to ensure passenger comfort. Thereafter, operations move to step S24. At step S22, if the controller 30 determines that the moisture density threshold Ma is not larger than the comfort level humidity, then the moisture density threshold Ma remains unchanged and operations move to step S24.

At step S24, the cabin air flow Q is determined. Specifically, the controller 30 monitors the speed of the blower 32 and the position of the air flow control door 38 and determines the cabin air flow Q from the duct 48 into the passenger compartment 14. Specifically, the cabin air flow Q is a function of blower speed and the mixture of cooled air and air re-heated by the heater core 52 and the size of the ducts 48 and 50.

At step S25, a calculated moisture density Me is determined as a function of the estimated moisture density $E_{Den}$ at the evaporator 28 and the value of a variable passenger moisture generation mPass divided by the cabin air flow Q. More specifically, the temperature of air leaving the evaporator 28 is measured by the temperature sensor 34 and the correlation data in Table 1 (above) is used to determine the corresponding value of $E_{Den}$. Next, the passenger moisture contribution mPass (a predetermined value measured in grams per minute) is divided by the cabin air flow Q and added to the estimated moisture density $E_{Den}$ at the evaporator 28. In other words, the amount of moisture that is estimated as coming from the evaporator 28 is added to the amount of moisture that is predicted as being generated by the passengers in the passenger compartment 14. Thus, the calculated moisture density Me is determined, representing the anticipated amount of moisture that is present in the passenger compartment at the current stage of operation of the air conditioning system 12.

The controller 30 determines the passenger moisture generation mPass based upon stored data. Through breathing and mild perspiration, the average person emits an anticipated amount of moisture. Such information is stored in the memory of the controller 30 for use in step S25.

At step S26, the controller 30 compares the moisture density threshold Ma with the calculated moisture density Me. If the moisture density threshold Ma is greater than the calculated moisture density Me then operation moves to step S27. At step S27, a difference DIFFM between the moisture density threshold Ma and the calculated moisture density Me is determined. At step S28, an adjustment is determined as a function of the difference DIFFM. At step S29, the required evaporator temperature RE is reevaluated and set based upon the upper evaporator control limit UCL plus the adjustment determined at step S28. Operations then move to FIG. 8, as described below.

At step S26, if the moisture density threshold Ma is not greater than the calculated moisture density Me then operation moves to step S30. At step S30, a difference DIFFM between the calculated moisture density Me and the moisture density threshold Ma is determined. At step S31, an offset is determined as a function of the difference DIFFM. At step S32, the required evaporator temperature RE is reevaluated and set based upon the upper evaporator control limit UCL minus the offset determined at step S31. Operations then move to FIG. 8, as described below.

In steps S27, S28 and S29, the difference DIFFM is converted into an adjustment value based on predetermined values that differ from vehicle to vehicle. Basically, the moisture densities (the moisture density threshold Ma and the estimated moisture density $E_{Den}$) are affected by temperature changes. For a typical four passenger compact vehicle, the correlation between the difference DIFFM and the adjustment is different than that for a full sized van. Consequently, tables correlating the difference DIFFM with the adjustment are determined vehicle type by vehicle type and are stored in memory of the controller 30. Similarly, the difference DIFFM and offset determined at steps S30, S31 and S32 are determined vehicle type by vehicle type and are stored in memory of the controller 30.

Description of the operations of the controller 30 continues now with specific reference to FIG. 8. The steps in FIG. 8 represent operational steps of the transition mode and the reduced load mode, described below.

At step S33 in FIG. 8, the requested outlet temperature RO is compared to the upper evaporator control limit UCL. Specifically, if the requested outlet temperature RO is less than the upper evaporator control limit UCL, then operation moves to step S34. At step S34, the upper evaporator control limit UCL is redefined as being equal to the requested outlet temperature RO. At step S35, the upper evaporator control limit UCL is compared to the freeze limit FL plus three degrees. It should be understood from the description herein that the addition of three degrees in S35 is merely one example of the practice of the present embodiment. For some applications of the present embodiment, an amount smaller than three degrees may be added and in other applications an amount greater than three degrees may be added. If the upper evaporator control limit UCL is less than the freeze limit FL plus three degrees, then control moves to step S36. If the upper evaporator control limit UCL is not less than the freeze limit FL plus three degrees, then control moves to step S37.

At step S33, if the requested outlet temperature $R_0$ is not less than the upper evaporator control limit UCL, then operation moves to step S37.

At step S37, the required evaporator temperature RE is compared with the upper evaporator control limit UCL. Specifically, if the required evaporator temperature RE is less than the upper evaporator control limit UCL, then operation moves to step S38.

At step S38, the required evaporator temperature RE is compared with the freeze limit FL plus three degrees. If the required evaporator temperature RE is not less than the freeze limit FL plus three degrees, operation moves to Step S40. If the required evaporator temperature RE is less than the freeze limit FL plus three degrees, operation moves to Step S39. At step S39, the required evaporator temperature RE is redefined as the freeze limit FL plus three degrees. At Step S40, the upper evaporator control limit UCL is redefined as the required evaporator temperature RE. At step S41, the lower evaporator control limit LCL is redefined as being equal to the upper evaporator control limit UCL minus three degrees.

At step S37, if the required evaporator temperature RE is not less than the upper evaporator control limit UCL, then operation moves to step S42.

Steps S42 through step S45 represent a portion of the transition mode. In other words, beginning at step S42, the evaporator 28 slowly warms up with each iteration of the logic set forth in the flowcharts. This process brings the evaporator 28 through the transition mode and up to temperatures enabling the reduced load mode.

At step S42, the upper evaporator control limit UCL is redefined as the upper evaporator control limit UCL plus the following: a predefined constant $\lambda 1$ multiplied by the difference between the required evaporator temperature RE and the upper evaporator control limit UCL. At step S43, the lower evaporator control limit LCL is redefined as being equal to the lower evaporator control limit LCL plus the following: a predefined constant $\lambda 2$ multiplied by the required evaporator temperature RE minus three degrees, minus the upper evaporator control limit UCL. Preferably the predefined constant $\lambda 2$ is slightly larger than the predefined constant $\lambda 1$. Both the predefined constant $\lambda 1$ and predefined constant $\lambda 2$ correspond to incremental increases in temperature that are determined based on the vehicle 10 and the capacity of the air conditioning system 12. Specifically, the predefined constant $\lambda 1$ and predefined constant $\lambda 2$ are experimentally derived to enable a smooth but gradual increase in the upper evaporator control limit UCL and the lower evaporator control limit LCL in the transition mode. As with step S39, in step S43, the minus three is not a fixed number, but merely one example of a desired difference between upper and lower temperature limits. For some systems, the difference between upper and lower control limits must be greater and for some systems smaller.

At step S44, the lower evaporator control limit LCL is compared to the upper evaporator control limit UCL minus two degrees. If the lower evaporator limit LCL is greater than the upper evaporator control limit UCL minus two degrees, then operation moves to step S45. At step S45, the lower evaporator limit LCL is redefined as being equal to the upper evaporator control limit UCL minus two degrees. At step S44, if the lower evaporator limit LCL is not greater than the upper evaporator control limit UCL minus two degrees, then operation returns to the top of FIG. 7 where the process cycles through continuously. In step S44 and S45, the minus two degrees is not a fixed number, but merely one example of a desired difference between upper and lower temperature limits. For some systems, the difference between upper and lower control limits may need to be greater and for some systems smaller.

Figure 9:
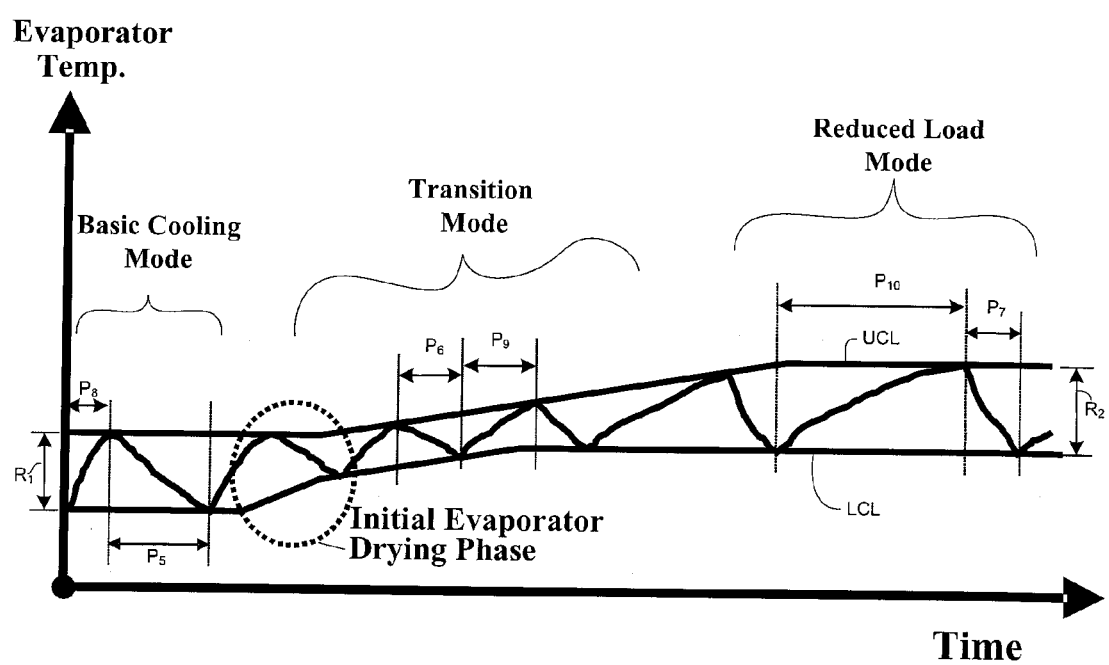
FIG. 9 is a chart showing evaporator temperature and compressor operation over time in a basic cooling mode, a transition mode and a reduced load mode in accordance with the second embodiment.

As indicated in the central portion of the graph in FIG. 9, the upper evaporator control limit UCL and the lower evaporator control limit LCL are gradually increased so that the compressor 22 cycles on and off at a lower frequency. Specifically, toward the left side of the graph in FIG. 9 in the basic cooling mode, the compressor 22 cycles on for a period $P_5$. During the transition mode, the compressor 22 cycles on for a shortened period $P_6$. Once the controller 30 operates in the reduced load mode, the compressor 22 cycles on for an even shorter period $P_7$. As can be seen in FIG. 9, the period $P_5$ is greater than the time periods $P_6$ and $P_7$. Further the time period $P_6$ is greater than the time period $P_7$.

Also indicated in FIG. 9, the time periods where the compressor 22 is not operating consequently lengthen during the reduced load mode as compared to the basic cooling mode. The data represented in FIG. 9 confirms that the compressor 22 does less work in the reduced load mode than in the basic cooling mode. Specifically, in the basic cooling mode, the compressor is off for time periods $P_8$. In the transition mode the compressor cycles off for increased time periods, such as the time period $P_9$. In the reduced load mode the compressor cycles off for time periods $P_{10}$. As can be seen in FIG. 9, the period $P_{10}$ is greater than the time periods $P_9$ and $P_8$, thus confirming that the compressor 22 is cycled off for longer periods of time between the shortened time periods where it is cycled on in the reduced load mode.

As demonstrated in the above embodiments, in the transition mode and the reduced load mode of operation, the controller 30 controls operation of the compressor 22 in order to maintain the humidity level at the evaporator 28 (and hence within the passenger compartment 14) below a predetermined level using the determined moisture density threshold Ma. The controller 30 accomplishes this control in the absence of an operating humidity sensor downstream of the evaporator 28 and upstream of the heater core 52. Consequently, unpleasant odors from the evaporator 28 are reduced or eliminated; condensation or fogging on the windows 16 is reduced and/or eliminated; the passenger compartment 14 is maintained at a comfortable temperature; and there is a reduction in workload done by the compressor 22 resulting in fuel economy savings.

Further, since the controller 30 maintains the evaporator 28 at elevated temperatures compared to conventional modes of operation, the amount of cooled air from the evaporator 28 that is re-heated by passing a portion of the cooled air through the heater core 52 is reduced. In other words, the Mix % depicted in FIG. 6 is minimized with the controller 30 operating in either the transition mode or the reduced load mode. Hence, less cooled air is re-heated.

Third Embodiment

Referring now to FIGS. 10-14, operational steps in accordance with a third embodiment will now be explained. In the third embodiment, the controller 30 is programmed or includes circuitry that enables operation of the compressor 22 including the basic steps described below. The third embodiment is another example of operation of the air conditioning system 12 by the controller 30.

In the third embodiment, the controller 30 operates the compressor 22 in a basic cooling mode, a transition mode and a reduced load mode, as described in greater detail below. In the third embodiment, the controller 30 is also programmed to control the positioning of the air flow control door 38.

Figure 10:
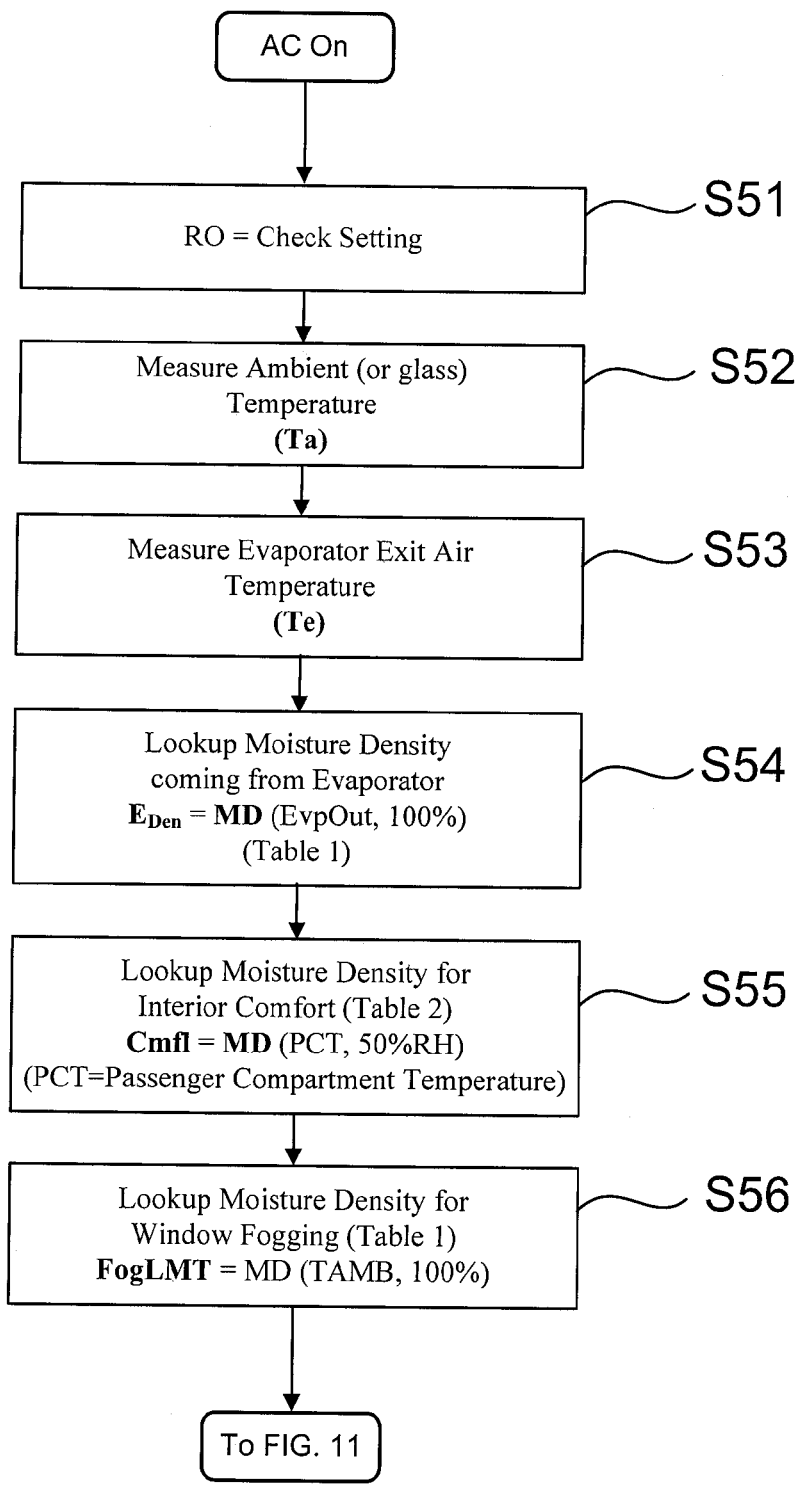
FIG. 10 is first flowchart showing an example of operational steps effected by the controller for determining variables used during control of the compressor in accordance with a third embodiment.
Figure 11:
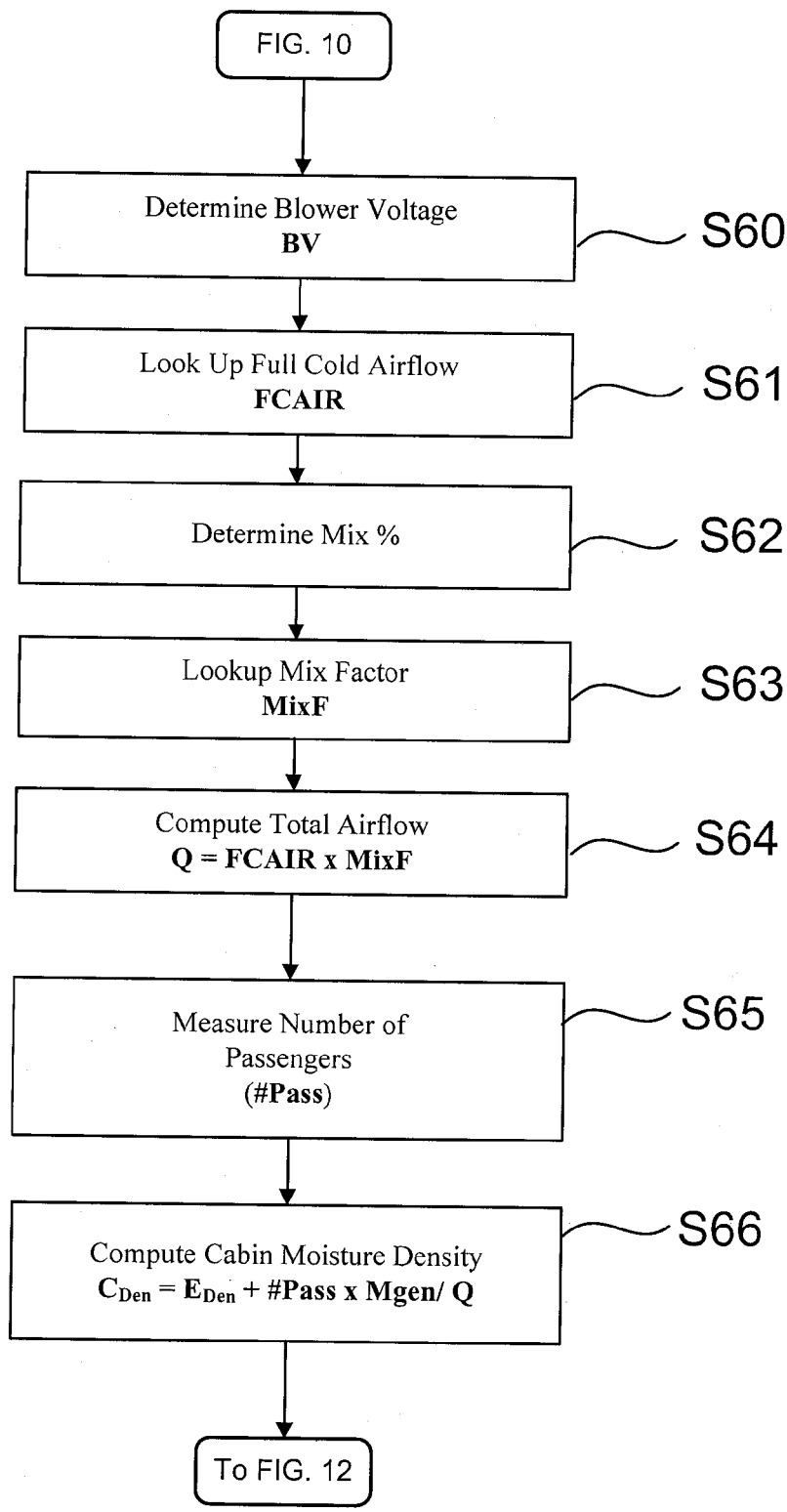
FIG. 11 is second flowchart showing an example of operational steps effected by the controller for determining further variables used during control of the compressor in accordance with the third embodiment.

In the flowchart depicted in FIGS. 10 and 11, the controller 30 determines and/or calculates various variables used during the control of the compressor 22. The controller 30 initially determines these variables when the air conditioning system 12 is turned on, and with each iteration of the logic presented in the flowcharts in FIGS. 10-14, redefines and/or updates the values of these variables as needed and/or required by changes in settings and temperature measurements, as is clear in the steps described further below.

As shown in FIG. 10, at step S51, the controller 12 checks the requested outlet temperature RO established by the driver or passenger for the passenger compartment 14. As mentioned above with respect to the second embodiment, the requested outlet temperature RO is typically set manually by the driver or passenger using air conditioning operation controls within the passenger compartment 14, in a conventional manner.

At step S52, the controller checks the ambient air temperature Ta measured by the ambient temperature sensor 36 and stores the temperature Ta in memory for subsequent calculations and determinations. At step S53, the controller 30 checks the temperature Te of the air exiting the evaporator 28 measured by the temperature sensor 34.

At step S54, the controller determines the value of the estimated moisture density $E_{Den}$ at the evaporator 28 using the temperature Te measured proximate the evaporator 28 and the correlation data of Table 1 (above). This value is stored in memory (and/or updated) for use during operation of the air conditioning system 12.

At step S55, the controller 30 determines a value of the comfort level humidity Cmfl. The comfort level humidity Cmfl is a level of humidity identified as being comfortable for vehicle passengers. The value of the comfort level humidity Cmfl can be determined in any of a variety of ways using the correlation data in Table 2 (above). For example, in the air conditioning system 12 that includes the passenger compartment temperature sensor 40, the measured temperature of the passenger compartment 14 is used to determine the comfort level humidity Cmfl from the correlation data listed in Table 2. Alternatively, in a system without a temperature sensor 40, the air conditioning control panel setting (the temperature set by the driver or passenger) can be used to determine the comfort level humidity Cmfl from the correlation data in Table 2. Still further, a pre-determined temperature corresponding to average passenger comfort settings can be used, where the pre-determined temperature is between, for example, 20° C. and 25° C. Hence, the controller 30 can use any of a variety of ways to determine and store the value of the comfort level humidity Cmfl.

At step S56, the ambient air temperature Ta measured by the ambient temperature sensor 36 is used by the controller 30 to look up a corresponding moisture density FogLMT using the correlation data in, for example, Table 1. During this step, the controller 30 can also adjust the measured ambient air temperature Ta upward slightly based upon the assumption that passenger compartment glass can be warmer than the measured ambient air temperature Ta. The value of the moisture density FogLMT is stored (and/or updated) and represents the moisture density level at which condensation is likely to form on glass at the ambient air temperature Ta.

Operations by the controller 30 then move to the steps represented in FIG. 11, where determinations and a calculation are made relating to air flow rate Q through the passenger compartment 14.

At step S60, the controller 30 detects a voltage reading from the blower motor 32 (FIG. 3 only) and the accesses additional data stored such as, for example, Table 3 below.

TABLE 3

Air Flow Data Table

| Blower Volts | Full Cold Airflow (cubic meters per minute) | Mix % | Mix Factor |
|---|---|---|---|
| 2 | 2.37 | 0 | 1.000 |
| 4 | 2.37 | 14 | 0.992 |
| 6 | 3.78 | 28 | 0.970 |
| 8 | 4.79 | 42 | 0.935 |
| 10 | 5.62 | 56 | 0.893 |
| 12 | 6.35 | 70 | 0.845 |
| 14 | 7.00 | 84 | 0.797 |
| 16 | 7.59 | 100 | 0.742 |

In step S61, the controller 30 uses the data in Table 3 to determine (and/or update) the value of a variable FCAIR (Full Cold Airflow in Table 3) at the voltage measured in step S60. At step S62 the controller 30 also uses the data in Table 3 to determine (and/or update) the value of a variable Mix % that corresponds to the value in the column Mix % and feedback from an air blending actuator that detects the position of the air flow control door 38. At step S63 the controller 30 also uses the data in Table 3 to determine (and/or update) the value of a variable MixF that corresponds to the value in the column Mix Factor at the voltage measured in step S60.

In step S64, the controller 30 calculates the total airflow Q entering the passenger compartment 14 as being the product of the variable FCAIR and the variable MixF.

In step S65 in FIG. 11, the controller 30 determines the number of passengers #Pass. This can be accomplished in any of a variety of ways. For example, the airbag deployment system can include detectors in the seats or optical sensors that determine the presence or absence of a passenger. The controller 30 can be coupled to the airbag deployment system to receive passenger number information.

In step S66, the controller 30 determines (and/or updates) a variable cabin moisture density $C_{Den}$. The cabin moisture density $C_{Den}$ is determined by adding the estimated moisture density $E_{Den}$ (at the evaporator 28) to the product of the number of passengers #Pass and the constant Mgen divided by the total air flow Q. The constant Mgen is a passenger moisture generation rate (per person in grams per minute) and is an approximation of the amount of moisture an average person at rest generates while breathing. The total air flow Q was determined in step S64.

Figure 12:
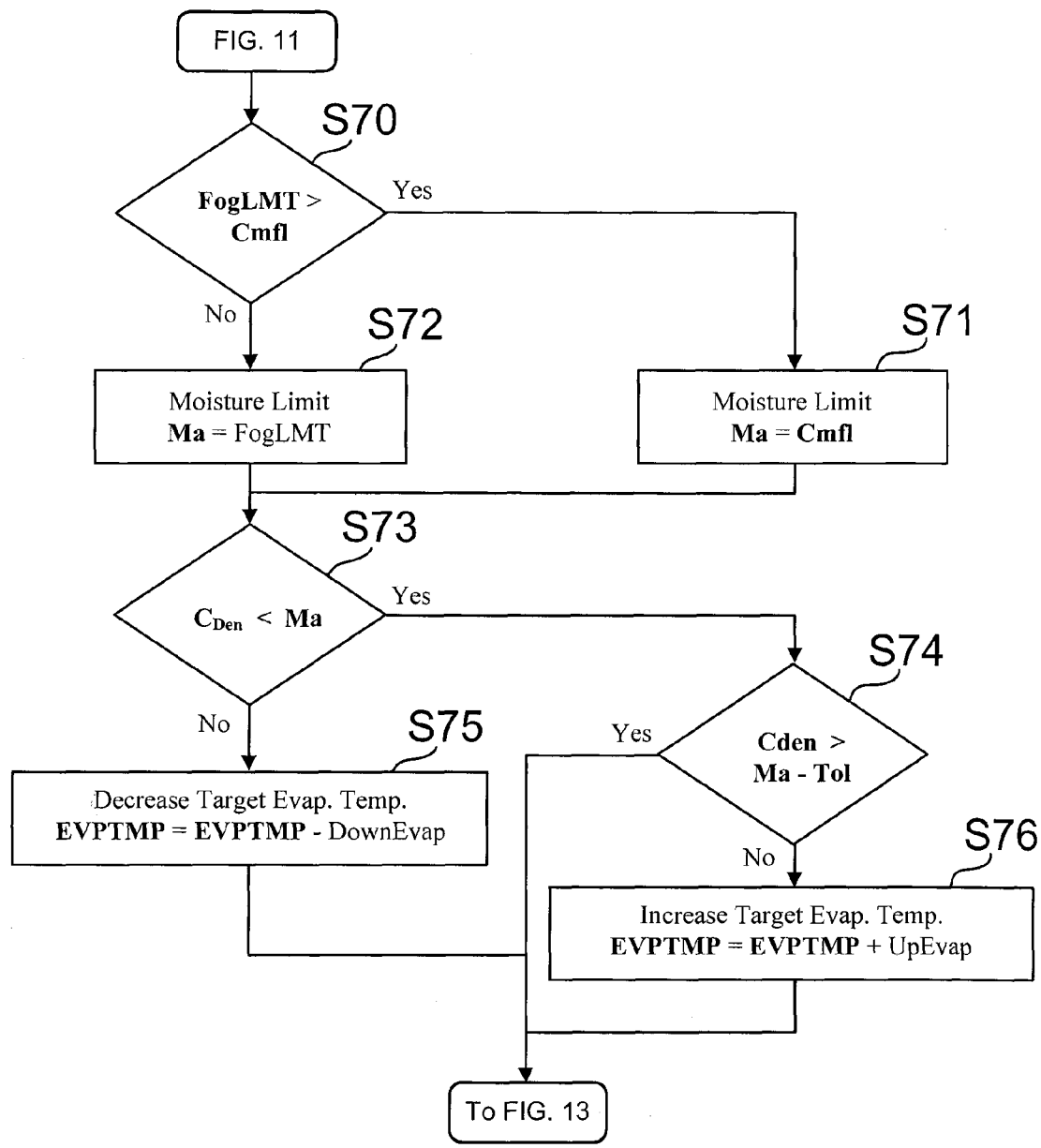
FIG. 12 is fourth flowchart showing an example of operational steps effected by the controller for determining a moisture density threshold used during the control of the compressor in accordance with the third embodiment.

Operational control next moves to the steps represented in FIG. 12. In FIG. 12 at step S70, the controller 30 compares the variable moisture density FogLMT with the variable comfort level humidity Cmfl. The comfort level humidity Cmfl was determined in step S55. The variable moisture density FogLMT was determined in step S56 and represents the moisture density level at the measured ambient temperature and at which condensation is likely to form on glass.

In step S70, if the variable moisture density FogLMT is greater than the comfort level humidity Cmfl, then operation moves to step S71. If the variable moisture density FogLMT is not greater than the comfort level humidity Cmfl, then operation moves to step S72. At step S71, the moisture density threshold Ma is defined as being equal to the comfort level humidity Cmfl. At step S72 the moisture density threshold Ma is defined as being equal to the moisture density FogLMT. After both steps S71 and S72, operation moves to step S73. Steps S70 thru steps S72 ensure that the prevention of condensation on glass surfaces of the vehicle 10 (and thus the preservation of driver visibility) takes precedence over passenger comfort.

At step S73, a comparison is made between the cabin moisture density $C_{Den}$ and the moisture density threshold Ma. Specifically, if the value of the calculated cabin moisture density $C_{Den}$ (calculated in step S66) is less than the value of the moisture density threshold Ma, then operation moves to step S74. If the value of the calculated cabin moisture density $C_{Den}$ is not less than the value of the moisture density threshold Ma, then operation moves to step S75.

At step S74, a comparison is made between the calculated cabin moisture density $C_{Den}$ and the moisture density threshold Ma minus a tolerance Tol, which was experimentally determined to be, for example, Tol=0.5 grams per cubic meter (0.5 g/m³). If the cabin moisture density $C_{Den}$ is greater than the moisture density threshold Ma minus the tolerance Tol, then operation moves to step S80 in FIG. 13. If the cabin moisture density $C_{Den}$ is not greater than the moisture density threshold Ma minus the tolerance Tol, then operation moves to step S76.

At step S75 (after step S73), a variable target evaporator temperature EVPTMP is made equal to its previous value minus 0.5 degrees Celsius (0.5° C.) in order to slightly reduce the amount of moisture in the air being cooled by the evaporator 28. At step S76 (after step S74), the variable target evaporator temperature EVPTMP is made equal to its previous value plus 0.5 degrees Celsius (0.5° C.) in order to slightly increase the amount of moisture in the air being cooled by the evaporator 28.

It should be understood from the drawings and description herein that in steps S75 and S76 the target evaporator temperature EVPTMP has its value changed by a predetermined amount. In the third embodiment, this incremental change in both steps is 0.5 degrees Celsius (0.5° C.). This incremental change is a predetermined value and is not fixed for all vehicles and all air conditioning systems. In some vehicles with powerful air conditioning systems a value smaller than 0.5 degrees Celsius (0.5° C.) can be utilized. In a vehicle with a relatively small capacity air conditioning system, a value larger than 0.5 degrees Celsius (0.5° C.) can be used to change the value of the target evaporator temperature EVPTMP. Also, the frequency of the calculation and the amount of change for each step are related. For example, if the logic steps presented in the depicted flowcharts includes rapid iterations (fast calculation cycles, for instance, every 100 ms), then very small EVPTMP changes are applied. Conversely, if the logic steps presented in the depicted flowcharts includes less frequent iterations (calculation cycles of, for example, 1000 ms), then very large EVPTMP changes are applied. A key point is that the air conditioning system 12 should operate such that the moisture condition is somewhat settled before making further adjustments so that such further adjustments are based on legitimately changed conditions.

Figure 13:
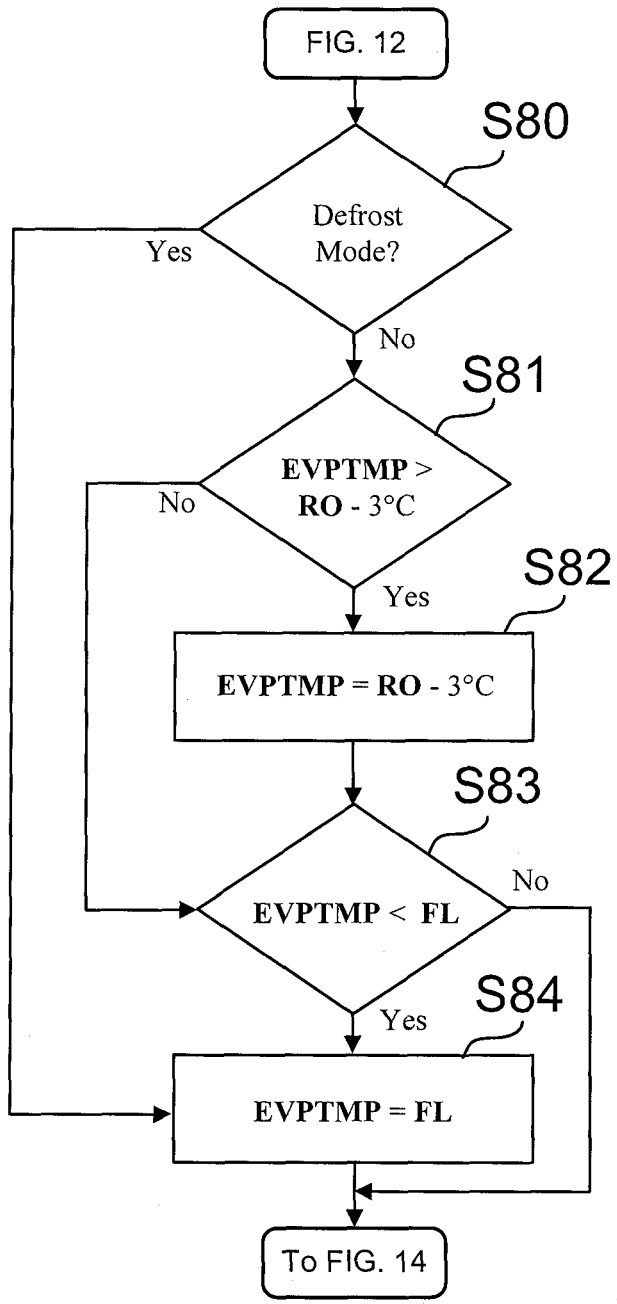
FIG. 13 is a fifth flowchart showing an example of operational steps effected by the controller for determining whether or not a defrost mode has been requested by a vehicle occupant while operating the compressor in accordance with the third embodiment.

Operational control by the controller 30 next moves to the steps represented in FIG. 13. The logic presented in FIG. 13 includes calculating changes in the target evaporator temperature EVPTMP when the defrost mode has been enabled or requested by a driver or a passenger of the vehicle 10. The logic in FIG. 13 also changes the target evaporator temperature EVPTMP after the defrost mode has been disabled and the air conditioning system has been reset to operate in the basic cooling mode or the reduced load mode.

In FIG. 13 at step S80, the controller 30 determines whether or not the defrost mode of the air conditioning system 12 has been requested by the driver or passenger of the vehicle 10. If the defrost mode has been requested, then operation moves to step S84. In step S84, the target evaporator temperature EVPTMP is redefined as being equal to a constant stored in the controller 30 known as a freeze limit FL. The freeze limit is defined in the current embodiment as 1.5 degrees Celsius (1.5° C.) and is set to prevent the formation of ice on heat exchanging surfaces of the evaporator 28. If the defrost mode has not been requested, then operation moves to step S81.

In step S81, the controller compares the value of the target evaporator temperature EVPTMP with the value of the requested outlet temperature RO minus 3 degrees (3° C.). The requested outlet temperature RO is stored in the controller 30.

In step S81, if the target evaporator temperature EVPTMP is greater than the requested outlet temperature RO minus 3 degrees, then operation moves to step S82. If the target evaporator temperature EVPTMP is not greater than the requested outlet temperature RO minus 3 degrees, then operation moves to step S83. At step S82, the target evaporator temperature EVPTMP is redefined as being equal to the requested outlet temperature RO minus 3 degrees (3° C.). At step S83, the target evaporator temperature EVPTMP is compared to the constant FL (freeze limit of the evaporator 28). If the target evaporator temperature EVPTMP is less than the constant FL, then operation moves to step S84 (described above). If the target evaporator temperature EVPTMP is not less than the constant FL, then operation moves to the logic in FIG. 14.

Figure 14:
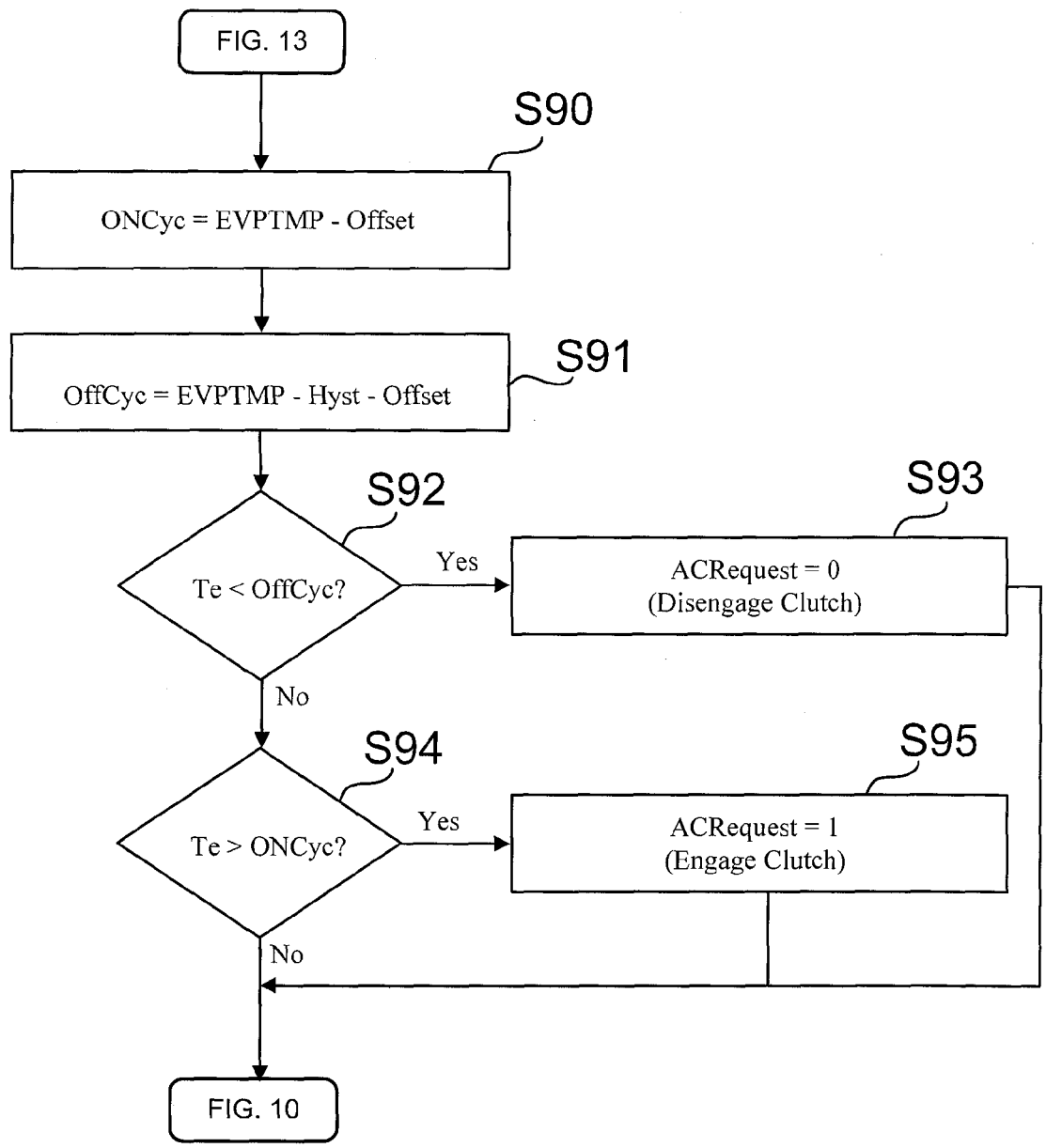
FIG. 14 is a sixth flowchart showing an example of operational steps effected by the controller while operating the compressor in accordance with the third embodiment.

As indicated at the bottom of FIG. 13, operational control by the controller 30 next moves to the steps represented in FIG. 14. The logic presented in FIG. 14 uses the calculated target evaporator temperature EVPTMP to control the operation of the clutch of the compressor 22.

In FIG. 14 at step S90, the controller 30 defines a variable ONCyc as being equal to the calculated target evaporator temperature EVPTMP minus an Offset. In the depicted embodiment, Offset is a constant that is equal to 0.3 degrees (0.3° C.) and is a predetermined value. The Offset constant is not a fixed value vehicle to vehicle, but rather, for each vehicle and each air conditioning system the value of Offset can vary.

At step S91, the controller 30 defines a variable OffCyc as being equal to the calculated target evaporator temperature EVPTMP minus Hyst and minus the Offset. The variable Hyst is equal to 2.0 degrees (2.0° C.). The variables ONCyc and OffCyc are subsequently used to control the operation of the compressor 22.

In step S92, the controller compares the measured temperature Te (step S53) with the variable OffCyc. The temperature Te represents the temperature of the air exiting the evaporator 28, as measured by the temperature sensor 34. If the temperature Te is less than the value of the variable OffCyc, then operation moves to step S93. If the temperature Te is not less than the value of the variable OffCyc, then operation moves to step S94.

At step S93, a variable ACRequest is set equal to zero (0) and the clutch of the compressor 22 is dis-engaged. Alternatively, if the compressor 22 is a variable capacity compressor, the amount of compression of refrigerant is reduced. Thereafter, operation returns to FIG. 10 for repeated iterations of the operation logic.

At step S94, the controller compares the measured temperature Te with the variable ONCyc. If the temperature Te is greater than the value of the variable ONCyc, then operation moves to step S95. If the temperature Te is not greater than the value of the variable ONCyc, then operation returns to FIG. 10 for repeated iterations of the logic.

At step S95, the variable ACRequest is set equal to one (1) and the clutch of the compressor 22 is engaged. Alternatively, if the compressor 22 is a variable capacity compressor, the amount of compression of refrigerant is increased. Thereafter, operation returns to FIG. 10 for repeated iterations of the operation logic.

Fourth Embodiment

Figure 15:
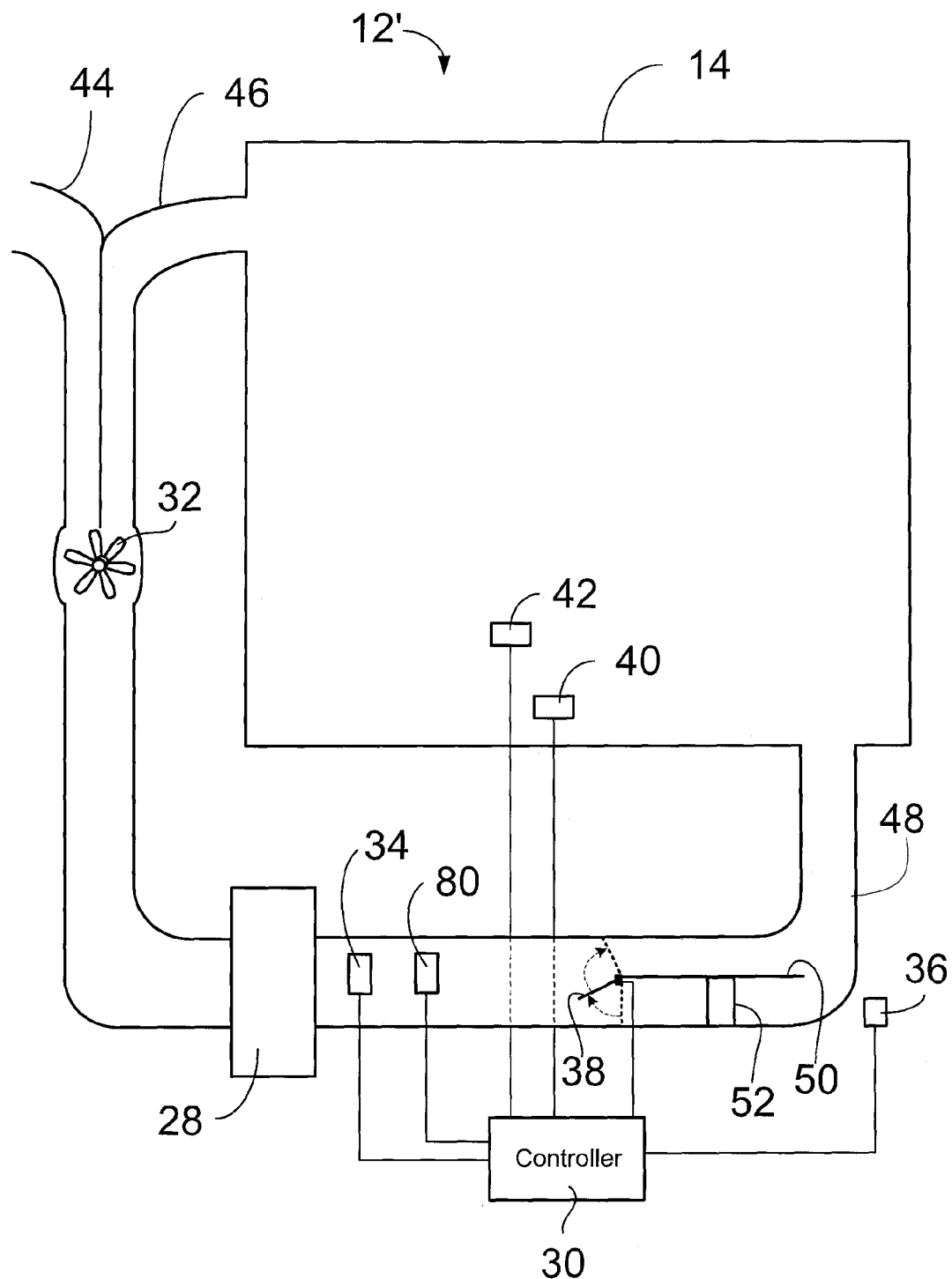
FIG. 15 is a schematic view of the air conditioning system showing a passenger compartment, the controller, the evaporator, a blower, a heater core mixing portion and various sensors connected to the controller in accordance with a fourth embodiment.

Referring now to FIG. 15, an air conditioning system 12' is depicted in accordance with a fourth embodiment and will now be explained. In the fourth embodiment, the air conditioning system 12' includes all of the elements, components and functions of the air conditioning system 12 depicted in FIG. 3 and described above. However, the air conditioning system 12' additionally includes a humidity sensor 80, located downstream from the evaporator 28 and upstream of the heater core 52. Hence, the humidity sensor 80 provides information relating to the amount of humidity present in the air that has been cooled by the evaporator 28. Operation of the air conditioning system 12' with the humidity sensor 80 in a fully functional state is the same as that described U.S. Pat. No. 7,975,496 to Eisenhour et al., issued Jul. 12, 2011 (assigned to Nissan North America, Inc.). U.S. Pat. No. 7,975,496 is incorporated herein by reference in its entirety.

In the fourth embodiment, the controller 30 is programmed to detect the functional state of the humidity sensor 80. Specifically, the controller 30 is configured to detect that the humidity sensor 80 is operating within prescribed parameters and detect that the humidity sensor 80 is not operating within prescribed parameters. If the controller 30 determines that the humidity sensor 80 is operating within prescribed parameters, then the air conditioning system 12' is operated in accordance with the logic presented in U.S. Pat. No. 7,975,496, where humidity measured by the humidity sensor 80 is used to determine the moisture density of the air cooled by the evaporator 28.

However, if the controller 30 determines that the humidity sensor 80 is not operating within prescribed parameters, then the controller 30 operates the air conditioning system 12' in accordance with the control logic described above in one of the first, second and third embodiments, where an estimated moisture density is used to determine the moisture density of the air cooled by the evaporator 28.

For example, if the humidity sensor 80 has short circuited or no longer outputs measurement signals that fall within a prescribed operating range, the controller 30 determines that the humidity sensor 80 is not operating in a fully functional state. In response to determining that the humidity sensor 80 is not operating in a fully functional state, the controller 30 operates the air conditioning system 12' using the logic described above in one of the first, second and third embodiments.

The controller 30 preferably includes a microcomputer with an air conditioning control program that controls the air conditioning system 12 as discussed below. The controller 30 can also include other conventional components such as an input interface circuit, an output interface circuit, and storage devices such as a ROM (Read Only Memory) device and a RAM (Random Access Memory) device. The microcomputer of the controller 30 is programmed to control the air conditioning system 12. The memory circuit stores processing results and control programs such as ones for compressor operation that are run by the processor circuit. The internal RAM of the controller 30 stores statuses of operational flags and various control data. The internal ROM of the controller 30 stores data, threshold values and instructions for various operations.

It will be apparent to those skilled in the art from this disclosure that the precise structure and algorithms for the controller 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Various components of the vehicle 10 are conventional components that are well known in the art. Since vehicles are well known in the art, these conventional structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the air conditioning system 12, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the air conditioning system. Accordingly, these terms, as utilized to describe the operation of the controller 30 should be interpreted relative to a vehicle equipped with the air conditioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the operational steps of the controller 30, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments are provided for illustration only, and not for the purpose of limiting the invention as defined by the appended claims and their equivalents.

What is claimed is:

1. A vehicle air conditioning system comprising:
   a compressor configured to compress refrigerant;
   a condenser fluidly coupled to the compressor to receive the refrigerant from the compressor;
   an evaporator fluidly coupled to the condenser to receive the refrigerant from the condenser and fluidly coupled to the compressor to supply the refrigerant to the compressor;
   a temperature sensor positioned proximate the evaporator to measure temperature of air passing through the evaporator prior to entering a vehicle passenger compartment; and
   a controller operatively coupled to the compressor to cycle the compressor on and off based upon the temperature measured by the temperature sensor and correlation data stored in the controller that correlates temperatures at the evaporator to estimated moisture densities at the evaporator to maintain the moisture density of the air in the vehicle passenger compartment below a predetermined moisture density threshold, the correlation data of the controller including a plurality of temperatures such that each temperature correlates to an estimated moisture density at a relative humidity of 100% at each temperature.

2. The vehicle air conditioning system according to claim 1, wherein
   the controller is operatively coupled to a second temperature sensor that is configured to measure air temperature outside of the passenger compartment, the controller being configured to set the moisture density threshold based on the air temperature outside of the passenger compartment to reduce window condensation.

3. The vehicle air conditioning system according to claim 2, wherein
   the controller is further configured to set the moisture density threshold based on estimated moisture contributions by passengers.

4. The vehicle air conditioning system according to claim 3, wherein
   the controller is operably coupled to at least one passenger detection device that detects a presence of at least one passenger, and the controller is configured to determine moisture contributions by passengers based on the presence of the at least one passenger.

5. The vehicle air conditioning system according to claim 1, further comprising:
   a heater core; and
   an air mixing assembly configured to selectively divert at least a portion of the air passing through the evaporator to the heater core, with the controller being operatively coupled to the air mixing assembly to control an amount of the air passing through the evaporator that is diverted to the heater core to attain a predetermined temperature range.

6. The vehicle air conditioning system according to claim 1, wherein
   the controller is operatively coupled to a second temperature sensor that is configured to measure a temperature of glass that at least partially encloses the passenger compartment, the controller being configured to set the moisture density threshold based on the measured temperature of the glass to reduce window condensation.

7. The vehicle air conditioning system according to claim 1, wherein
   the controller is operably coupled to at least one passenger detection device that detects a presence of at least one passenger, and the controller is configured to determine moisture contributions by passengers based on the presence of the at least one passenger.

8. A vehicle air conditioning system comprising:
   a compressor configured to compress refrigerant;
   a condenser fluidly coupled to the compressor to receive the refrigerant from the compressor;
   an evaporator fluidly coupled to the condenser to receive the refrigerant from the condenser and fluidly coupled to the compressor to supply the refrigerant to the compressor;

a humidity sensor positioned proximate the evaporator to detect a moisture density of air passing through the evaporator towards a vehicle passenger compartment;

a temperature sensor positioned proximate the evaporator to measure a temperature of the air passing through the evaporator prior to entering the vehicle passenger compartment; and a controller operatively coupled to the humidity sensor, the temperature sensor and the compressor to cycle the compressor on and off to maintain the moisture density of air being cooled by the evaporator below a predetermined moisture density threshold, the controller being configured to detect operability of the humidity sensor such that:

in response to detecting that the humidity sensor is operable, the controller cycles the compressor based upon moisture content measured by the humidity sensor; and in response to detecting that the humidity sensor is inoperable, the controller cycles the compressor based on the temperature measured by the temperature sensor and correlation data that correlates temperatures at the evaporator to estimated moisture densities at the evaporator, the correlation data of the controller includes a plurality of temperatures such that each temperature correlates to an estimated moisture density at a relative humidity of 100% at each temperature.

9. The vehicle air conditioning system according to claim 8, wherein
the controller is operatively coupled to a second temperature sensor that is configured to measure air temperature outside of the passenger compartment, the controller being configured to set the moisture density threshold based on the air temperature outside of the passenger compartment to reduce window condensation.

10. The vehicle air conditioning system according to claim 9, wherein
the controller is further configured to set the moisture density threshold based on estimated moisture contributions by passengers.

11. The vehicle air conditioning system according to claim 10, wherein
the controller is operably coupled to at least one passenger detection device that detects presence of at least one passenger, and the controller is configured to determine moisture contributions by passengers based on the presence of the at least one passenger.

12. A method for operating a vehicle air conditioning system comprising:

cooling air entering a passenger compartment by blowing the air through an evaporator of a refrigerant circuit;

monitoring a temperature of the air entering the passenger compartment at the evaporator;

setting a moisture density threshold for the air entering the passenger compartment; and cycling a compressor of the refrigerant circuit between a refrigerant compressing state and an non-compressing state to maintain the moisture density of air within the passenger compartment below the moisture density threshold based upon the temperature measured in the monitoring of the temperature at the evaporator, which correlates to an estimated moisture density at the evaporator that is determined using correlation data correlating measured temperatures to estimated moisture densities at the evaporator, the correlation data of the controller including a plurality of temperatures with each temperature correlating to an estimated moisture density based on a relative humidity of 100% at each temperature.

13. The method according to claim 12, wherein
the setting of the moisture density threshold includes measuring ambient temperature outside of the passenger compartment to determine a condensation temperature for preventing condensation on an inner surface of a vehicle window.

14. The method according to claim 13, wherein
the setting of the moisture density threshold includes using estimated moisture contributions by passengers as a basis for determining the condensation temperature for preventing condensation on the inner surface.

15. The method according to claim 14, further comprising selectively heating a portion of air entering the passenger compartment to maintain air temperature within the vehicle compartment within a predetermined temperature range.

16. The method according to claim 12, wherein
the setting of the moisture density threshold includes measuring a temperature of glass that at least partially encloses the passenger compartment to determine a condensation temperature for preventing condensation on an inner surface of a vehicle window.

17. The method according to claim 16, wherein
the setting of the moisture density threshold includes using estimated moisture contributions by passengers as a basis for determining the condensation temperature for preventing condensation on the inner surface.

18. The method according to claim 17, further comprising selectively heating a portion of air entering the passenger compartment to maintain air temperature within the vehicle compartment within a predetermined temperature range.

* * * * *